(12) United States Patent
Kanokogi et al.

(10) Patent No.: US 11,442,416 B2
(45) Date of Patent: Sep. 13, 2022

(54) PLANT CONTROL SUPPORTING APPARATUS, PLANT CONTROL SUPPORTING METHOD, AND RECORDING MEDIUM

(71) Applicant: Yokogawa Electric Corporation, Tokyo (JP)

(72) Inventors: Hiroaki Kanokogi, Tokyo (JP); Go Takami, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 1067 days.

(21) Appl. No.: 16/031,568

(22) Filed: Jul. 10, 2018

(65) Prior Publication Data

US 2019/0018374 A1    Jan. 17, 2019

(30) Foreign Application Priority Data

Jul. 13, 2017    (JP) .............................. JP2017-136899

(51) Int. Cl.

| | |
|---|---|
| *G05B 13/02* | (2006.01) |
| *G05B 13/04* | (2006.01) |
| *G06N 7/02* | (2006.01) |
| *G05B 23/02* | (2006.01) |
| *G06K 9/62* | (2022.01) |

(52) U.S. Cl.
CPC ....... *G05B 13/042* (2013.01); *G05B 13/0265* (2013.01); *G05B 23/0208* (2013.01); *G05B 23/0294* (2013.01); *G06K 9/6277* (2013.01); *G06N 7/023* (2013.01); *G05B 23/0283* (2013.01)

(58) Field of Classification Search
CPC .............. G05B 13/042; G05B 13/0265; G05B 23/0208; G05B 23/0294; G06K 9/6277; G06N 7/023; G06B 23/0283
USPC .......................................................... 706/12
See application file for complete search history.

(56) References Cited

U.S. PATENT DOCUMENTS

| | | | | |
|---|---|---|---|---|
| 6,721,606 B1 * | 4/2004 | Kaji | ................... | G05B 13/0265 700/32 |
| 2004/0049295 A1 * | 3/2004 | Wojsznis | ............. | G05B 13/042 700/28 |

(Continued)

FOREIGN PATENT DOCUMENTS

JP    2014-174993 A    9/2014

*Primary Examiner* — Omar F Fernandez Rivas
*Assistant Examiner* — Shamcy Alghazzy
(74) *Attorney, Agent, or Firm* — Sughrue Mion, PLLC

(57) ABSTRACT

A plant control supporting apparatus includes a segment selector configured to select, from among a plurality of segments defined in a plant, a segment for which learning for acquiring an optimal value of at least one parameter representing an operation state is executed, a reward function definer configured to define a reward function used for the learning, a parameter extractor configured to extract at least one parameter that is a target for the learning in the selected segment on the basis of input and output information of a device used in the plant and segment information representing a configuration of a device included in the selected segment, and a learner configured to perform the learning for acquiring the optimal value for each segment on the basis of the reward function and the at least one parameter.

16 Claims, 12 Drawing Sheets

(56) References Cited

U.S. PATENT DOCUMENTS

| | | | |
|---|---|---|---|
| 2006/0241786 A1* | 10/2006 | Boe | G05B 13/042 |
| | | | 700/28 |
| 2008/0046603 A1* | 2/2008 | Kobayashi | G06F 11/364 |
| | | | 710/17 |
| 2014/0257526 A1 | 9/2014 | Tiwari et al. | |
| 2017/0003676 A1 | 1/2017 | Yoshida et al. | |
| 2017/0288455 A1* | 10/2017 | Fife | G05B 13/048 |
| 2017/0364043 A1* | 12/2017 | Ganti | G05B 15/02 |

* cited by examiner

FIG. 5

| DEVICE ID | DEVICE TYPE | INSTALLED PLACE | CONTROL LOOP NAME | I/O TYPE | IOP LOWER LIMIT VALUE | IOP UPPER LIMIT VALUE | UNIT | DEVICE IMPORTANCE LEVEL |
|---|---|---|---|---|---|---|---|---|
| P1234 | PRESSURE GAUGE | SITE A | LOOP 1 | FOR MONITOR | -6 | 106 | hPa | LOW |
| P1235 | THERMOMETER | SITE A | LOOP 1 | FOR MONITOR | 0 | 100 | % | HIGH |
| P1236 | VALVE | SITE A | LOOP 1 | FOR OPERATION | 0 | 100 | % | LOW |
| P1237 | PRESSURE GAUGE | SITE A | LOOP 2 | FOR MONITOR | 30 | 80 | % | HIGH |
| P1238 | THERMOMETER | SITE A | LOOP 2 | FOR MONITOR | 10 | 15 | °C | MIDDLE |
| P1239 | VALVE | SITE A | LOOP 2 | FOR OPERATION | 0 | 100 | % | HIGH |
| P1240 | PRESSURE GAUGE | SITE B | LOOP 3 | FOR MONITOR | -6 | 106 | hPa | LOW |
| P1241 | THERMOMETER | SITE B | LOOP 3 | FOR MONITOR | 0 | 100 | % | HIGH |
| P1242 | VALVE | SITE B | LOOP 3 | FOR OPERATION | 0 | 100 | % | LOW |
| P1243 | PRESSURE GAUGE | SITE B | LOOP 4 | FOR MONITOR | 30 | 80 | % | HIGH |
| P1244 | THERMOMETER | SITE B | LOOP 4 | FOR MONITOR | 10 | 15 | °C | MIDDLE |
| P1245 | VALVE | SITE B | LOOP 4 | FOR OPERATION | 0 | 100 | % | HIGH |

FIG. 6

| DEVICE IMPORTANCE LEVEL | CONTROL LOOP NAME | | | |
|---|---|---|---|---|
| | LOOP 1 | LOOP 2 | LOOP 3 | LOOP 4 |
| HIGH | HIGH | HIGH | MIDDLE | MIDDLE |
| MIDDLE | MIDDLE | MIDDLE | LOW | LOW |
| LOW | LOW | LOW | NO DISPLAY | NO DISPLAY |

PLANT CONTROL SUPPORTING APPARATUS, PLANT CONTROL SUPPORTING METHOD, AND RECORDING MEDIUM

BACKGROUND OF THE INVENTION

Field of the Invention

The present invention relates to a plant control supporting apparatus, a plant control supporting method, and a recording medium.

The present application claims priority based on Japanese patent application 2017-136899, filed on Jul. 13, 2017 and includes herein by reference the content thereof.

Description of Related Art

In plants or factories such as chemical industry plants and the like, plants that manage and control a well site of a gas field, an oil field, or the like and the surroundings thereof, plants that manage and control power generation such as hydroelectric power generation, thermal power generation, nuclear power generation, or the like, plants that manage and control environmental power generation such as solar power generation and wind power generation, or the like, or plants that manage and control water supply and sewerage, a dam, or the like (hereinafter, in a case in which these are collectively referred to, they will be referred to as "plants"), distributed control systems (DCSs) in which field instruments such as a measuring device, an actuator, and the like called field devices and a control apparatus controlling these are connected through a communication unit have been built, and a high-degree automatic operation using a DCS is realized.

In a system of plants as described above, operation states such as the yield of plants, a driving status, the status of generation of alarms, and the like are measured using measuring devices such as sensors. Then, measured values are collected through a DCS and are displayed in a monitoring device such as a control board or a monitor of a monitoring terminal. In a case in which an abnormality in a plant is recognized using a monitoring device, a case in which the yield of plants is increased or decreased, or the like, a board operator monitoring an operation state of plants instructs an operator called a field operator to perform inspection, maintenance, replacement, or the like of field devices or adjustment of an actuator such as a valve or the like.

Recently, technologies for optimizing adjustment of such an actuator and the like using artificial intelligence and automating plant operations have been considered. For example, a plant control system disclosed in Japanese Unexamined Patent Application, First Publication No. 2014-174993 (hereinafter, referred to as "Patent Document 1") provides information for an operator using artificial intelligence using a judgement model having input information of sensors and the like as sample data.

SUMMARY OF THE INVENTION

It is considered that the operation states of plants can be easily optimized by using the technologies of artificial intelligence disclosed in Patent Document 1 described above or the like. However, generally, in an operation of plants, a range to be learned by the artificial intelligence is broad, and the number of parameters to be learned is very large, and accordingly, there are cases in which an unrealistically long time is required until learning for acquiring optimal values of parameters representing the operation states of plants converges, or the learning does not converge.

One aspect of the present invention provides a plant control supporting apparatus, a plant control supporting method, and a recording medium capable of causing learning for acquiring optimal values of parameters representing operation states of plants to easily converge in a shorter time.

A plant control supporting apparatus according to a first aspect of the present invention may include a segment selector configured to select, from among a plurality of segments defined in a plant, a segment for which learning for acquiring an optimal value of at least one parameter representing an operation state is executed, a reward function definer configured to define a reward function used for the learning, a parameter extractor configured to extract at least one parameter that is a target for the learning in the selected segment on the basis of input and output information of a device used in the plant and segment information representing a configuration of a device included in the selected segment, and a learner configured to perform the learning for acquiring the optimal value of the at least one parameter for each segment on the basis of the reward function and the extracted at least one parameter.

The above-described plant control supporting apparatus may further include a parameter classifier configured to classify the at least one parameter extracted by the parameter extractor into variable parameters inside the selected segment, monitor parameters inside the selected segment, variable parameters outside the selected segment, or fixed parameters outside the selected segment on the basis of the segment information and the input and output information. The learner may be configured to perform the learning on the basis of the parameters classified by the parameter classifier.

In the above-described plant control supporting apparatus, the learner may be configured to perform the learning using a relationship model, which represents the relationship between parameters, on the basis of the segment information.

In the above-described plant control supporting apparatus, the segment selector may be configured to sequentially select the plurality of segments defined in the plant in accordance with a flow of processes in the plant.

The above-described plant control supporting apparatus may further include a whole optimizer configured to perform learning for optimization of parameters for the whole plant on the basis of parameters acquired in the learning performed for each segment.

In the above-described plant control supporting apparatus, the reward function definer may be configured to define a penalty function for decreasing a value of the reward function in accordance with a value on the basis of an alarm generated in the plant. The learner may be configured to perform the learning for each segment on the basis of the penalty function.

The above-described plant control supporting apparatus may further include a parameter refiner configured to refine the at least one parameter extracted by the parameter extractor by specifying at least one parameter not contributing to a purpose of maximizing the reward function on the basis of the segment information and excluding the specified at least one parameter from the at least one parameter extracted by the parameter extractor.

In the above-described plant control supporting apparatus, the plurality of segments may include a first segment and a second segment in a upstream of the first segment in a flow of processes in the plant. The segment selector may be configured to select the first segment, and then select the second segment.

In the above-described plant control supporting apparatus, the plurality of segments may include a first segment and a second segment in a upstream of the first segment in a flow of processes in the plant. The segment selector may be configured to select the first segment, and then select the second segment. The variable parameter outside the segment classified by the parameter classifier when the segment selector selects the first segment may correspond to the fixed parameter outside the segment classified by the parameter classifier when the segment selector selects the second segment.

A plant control supporting method using a computer according to a second aspect of the present invention may include selecting, from among a plurality of segments defined in a plant, a segment for which learning for acquiring an optimal value of at least one parameter representing an operation state is executed, defining a reward function used for the learning, extracting at least one parameter that is a target for the learning in the selected segment on the basis of input and output information of a device used in the plant and segment information representing a configuration of a device included in the selected segment, and performing the learning for acquiring the optimal value of the at least one parameter for each segment on the basis of the reward function and the extracted at least one parameter.

The above-described plant control supporting method may further include classifying the at least one parameter extracted into variable parameters inside the selected segment, monitor parameters inside the selected segment, variable parameters outside the selected segment, or fixed parameters outside the selected segment on the basis of the segment information and the input and output information. The learning may include learning on the basis of the parameters classified.

In the above-described plant control supporting method, the learning may include learning using a relationship model, which represents the relationship between parameters, on the basis of the segment information.

In the above-described plant control supporting method, selecting the segment may include sequentially selecting the plurality of segments defined in the plant in accordance with a flow of processes in the plant.

The above-described plant control supporting method may further include performing learning for optimization of parameters for the whole plant on the basis of parameters acquired in the learning performed for each segment.

In the above-described plant control supporting method, defining the reward function may include defining a penalty function for decreasing a value of the reward function in accordance with a value on the basis of an alarm generated in the plant. The learning may include learning for each segment on the basis of the penalty function.

The above-described plant control supporting method may further include refining the at least one parameter extracted by specifying at least one parameter not contributing to a purpose of maximizing the reward function on the basis of the segment information and excluding the specified at least one parameter from the at least one parameter extracted.

In the above-described plant control supporting method, the plurality of segments may include a first segment and a second segment in a upstream of the first segment in a flow of processes in the plant. Selecting the segment may include selecting the first segment, and then selecting the second segment.

In the above-described plant control supporting method, the plurality of segments may include a first segment and a second segment in a upstream of the first segment in a flow of processes in the plant. Selecting the segment may include selecting the first segment, and then selecting the second segment. The variable parameter outside the segment classified when the first segment is selected may correspond to the fixed parameter outside the segment classified when the second segment is selected.

A non-transitory computer-readable storage medium storing a plant control supporting program according to a third aspect of the present invention, which when executed by a computer, may cause the computer to select, from among a plurality of segments defined in a plant, a segment for which learning for acquiring an optimal value of at least one parameter representing an operation state is executed, define a reward function used for the learning, extract at least one parameter that is a target for the learning in the selected segment on the basis of input and output information of a device used in the plant and segment information representing a configuration of a device included in the selected segment, and perform the learning for acquiring the optimal value of the at least one parameter for each segment on the basis of the reward function and the extracted at least one parameter.

In the above-described non-transitory computer-readable storage medium, the plant control supporting program, which when executed by the computer, may further cause the computer to classify the at least one parameter extracted into variable parameters inside the selected segment, monitor parameters inside the selected segment, variable parameters outside the selected segment, or fixed parameters outside the selected segment on the basis of the segment information and the input and output information. The learning may include learning on the basis of the parameters classified.

According to the one aspect of the present invention, the learning for acquiring optimal values of parameters representing operation states of plants can easily converge in a shorter time.

BRIEF DESCRIPTION OF THE DRAWINGS

FIG. 5 is a diagram showing the configuration of an I/O diagram used by the plant control supporting apparatus according to the first embodiment of the present invention.

FIG. 6 is a diagram showing the configuration of alarm setting definition data used by the plant control supporting apparatus according to the first embodiment of the present invention.

DETAILED DESCRIPTION OF THE INVENTION

First Embodiment

[Overview of Plant]

Figure 1:
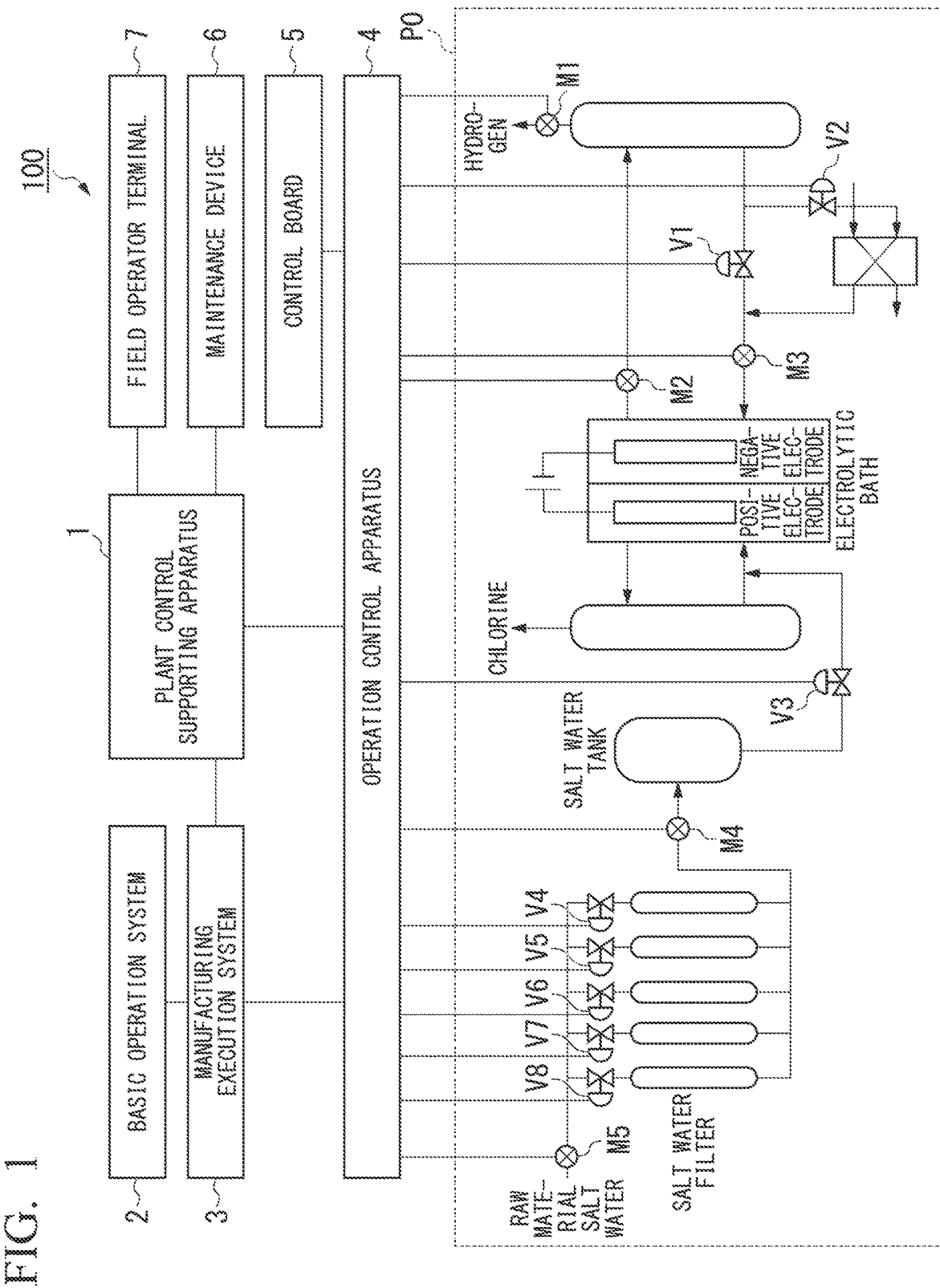
FIG. 1 is a schematic diagram showing the configuration of a plant using a plant control supporting apparatus according to a first embodiment of the present invention.

Hereinafter, one example of the configuration of a plant using a plant control supporting apparatus will be described with reference to the drawings. FIG. 1 is a schematic diagram showing the configuration of a plant 100 using a plant control supporting apparatus 1 according to a first embodiment of the present invention.

As shown in the drawing, the plant 100 includes the plant control supporting apparatus 1, a basic operation system 2, a manufacturing execution system 3, an operation control apparatus 4, a control board 5, a maintenance device 6, a field operator terminal 7, and a plant device P0.

The plant device P0 generates a predetermined product (final product). The plant device P0 shown in FIG. 1 as an example is a plant device that generates hydrogen and chloride from raw material salt water. As shown in the drawing, the plant device P0 includes various devices including monitors M1 to M5 and valves V1 to V8.

The monitors M1 to M5, for example, are input devices such as a differential pressure gauge, a thermometer, a flowmeter, and the like that input signals of physical quantities (a pressure, a temperature, a flow rate, and the like) into the operation control apparatus 4. The monitor M1 is a measuring device that measures the yield of one kind (hydrogen) of final products generated by the plant device P0. In the present embodiment, the plant 100 is a plant controlled such that a yield of a product measured by the monitor M1 becomes a target yield.

The valves V1 to V8 are output devices that operate in accordance with an instruction of valve opening from the operation control apparatus 4 and adjust the flow rate or pressure of a material, a product, or the like by changing the valve opening.

Hereinafter, in the plant device P0, the monitors M1 to M5 and the valves V1 to V8 will be referred to as "field devices." The field devices are control targets of the plant control supporting apparatus 1, and the plant control supporting apparatus 1 can control the yield and the like of a product generated by the plant device P0 by controlling the field devices.

In the following description, the "plant device P0" refers to one or a plurality of devices (including the field devices) included in the plant device P0.

The configuration of the plant device P0 in FIG. 1 is shown as one example. As long as the plant device P0 controls the yield and the like of a product by performing an adjustment operation using output devices, for example, such as the valves V1 to V8 and the like on the basis of physical quantities measured using input devices, for example, such as the monitors M1 to M5 and the like, the plant device P0 is not limited to the configuration of the plant device P0 shown in FIG. 1.

The input devices and the output devices are not limited to the valves, the monitors, and the like included in the configuration described above. For example, the plant device P0 may include devices such as switches as the input devices. For example, the plant device P0 may include devices such as actuators of pumps or the like, heaters, and the like as the output devices.

The basic operation system 2, for example, is an enterprise resource planning (ERP) system specifically for the process manufacturing industry for managing enterprise resources such as an accounting process, production management, and sales management. The basic operation system 2 may use information of an operation state of the plant as management information of enterprise resources. The basic operation system 2 may include a maintenance managing system managing the maintenance of the plant and the business information of repairs and the like. The basic operation system 2, for example, includes a general-purpose computer such as a server apparatus or a desktop-type personal computer (PC), or the like.

The manufacturing execution system 3, for example, is a manufacturing execution system (MES) positioned between the basic operation system 2 and the operation control apparatus 4. The manufacturing execution system 3 monitors and manages an operation state of the plant device P0, an operation status of an operator, and the like acquired by the operation control apparatus 4. The manufacturing execution system 3 communicates with the plant control supporting apparatus 1 and, for example, outputs information such as a target yield and the like acquired from the basic operation system 2 to the plant control supporting apparatus 1. The manufacturing execution system 3 acquires an operation instruction used for operating the plant device P0 from the plant control supporting apparatus 1. The manufacturing execution system 3 includes a general-purpose computer such as a server apparatus or a desktop-type PC.

The operation control apparatus 4 controls the operations of the field devices by acquiring measured values from the input devices such as the monitors M1 to M5 and outputting operation instructions for operating the output devices such as the valves V1 to V8. In the present embodiment, input values input from the monitors M1 to M5 to the operation control apparatus 4 and output values output from the operation control apparatus 4 to the valves V1 to V8 and the like are indexes (numerical indexes) representing the operation states of the plant using numerical values, and the numerical indexes are input and output between the plant control supporting apparatus 1 and the operation control apparatus 4. The operation control apparatus 4, for example, includes devices such as a factory automation (FA) computer, a programmable logic controller (PLC), and the like.

The control board 5 is a device used by a field operator of the plant for monitoring the operation states of the field devices and operating the field devices. The control board 5, for example, includes display devices such as a lamp, a display, and the like or operation devices such as a press button switch, a keyboard, and the like. For example, a field operator who has received an operation instruction for instructing an operation of a plant output from the plant control supporting apparatus 1 to be described later operates the field devices of the plant device P0 using the operation device of the control board 5.

The maintenance device 6 is a device for a field operator to perform maintenance of the field devices. The maintenance of the field devices, for example, is a process of reading and checking device information (parameters) set in the field devices, a process of setting new device information (parameters) in a field device, a process of adjusting or changing the device information set in the field device, a process of causing a field device to perform a predetermined operation by setting device information in the field device, and the like.

The maintenance device 6 has a communication function for communicating with a field device, for example, using wired communication or wireless communication. The maintenance device 6 performs maintenance of the field devices using the communication function. In the maintenance performed by the maintenance device 6 using the communication function, information transmitted to or received from the field devices will be referred to as "maintenance information." In the maintenance information, in addition to information read from the field devices a described above, text information, video information, audio information, and the like recorded by a field operator in the maintenance device 6 may be included. The maintenance device 6 transmits the maintenance information to the plant control supporting apparatus 1. The maintenance device 6 is a computer of a notebook type or a tablet type, a personal digital assistant (PDA), a smartphone, or the like.

The field operator terminal 7 is a terminal device held by a field operator. The field operator terminal 7 acquires an operation instruction for instructing the operation of a plant output from the plant control supporting apparatus 1. The field operator terminal 7, for example, acquires an operation instruction from the plant control supporting apparatus 1 using a communication unit such as electronic mail, chatting, a voice phone call, or the like and notifies a field operator of the operation instruction. The field operator terminal 7 is a computer of a notebook type or a tablet type, a PDA, a smartphone, or the like.

The plant control supporting apparatus 1 communicates with the manufacturing execution system 3, the operation control apparatus 4, the maintenance device 6, and the field operator terminal 7. The plant control supporting apparatus 1 acquires states of field devices from the operation control apparatus 4 and the maintenance device 6. The plant control supporting apparatus 1 controls the plant device P0 by outputting an operation instruction to the operation control apparatus 4 or the field operator terminal 7.

The plant control supporting apparatus 1 optimizes parameter values by performing learning using artificial intelligence for the parameters of the field devices included in the plant device P0 on the basis of various kinds of data specific to the plant, for example, an input and output (I/O) diagram, a segment diagram, alarm setting definition data, parameter provisional initial value data, and the like.

The parameter is device information of a field device included in the plant device P0 and, for example, is a sensor value in a case in which the field device is a sensor or a value representing valve opening or the like in a case in which the field device is a valve.

The I/O diagram (input and output information) is data including a list of field devices included in the plant device P0 and is data defining an identifier used for identifying a field device, a type of the field device (for example, a valve, a sensor, or the like), a unit of measured values, and the like.

The segment diagram (segment information) is data visually representing the configuration of piping installed inside the plant device P0, blocks (segments) configuring the plant device P0, and the like.

The alarm setting definition data, for example, is data defining a threshold (at least one of an upper limit value and a lower limit value) of a sensor value used for determining the state of a sensor to be abnormal, the degree of importance of an alarm generated in a case in which an abnormality is determined, and the like.

The parameter provisional initial value data is data representing rough values such as a sensor value, valve opening, and the like that are predicted from the design of the plant device P0 in a case in which the plant device P0 operates normally.

Since the plant control supporting apparatus 1 can output an operation instruction to replace (assist with) an operation of a board operator, human-induced mistakes of a board operator can be decreased, and the stability of the plant can be improved. By replacing or assisting a board operator, the plant control supporting apparatus 1 can eliminate (or decrease) the load of a board operator, and accordingly, the labor costs of the board operator are reduced, and the running cost of the operation of the plant can be decreased.

[Hardware Configuration of Plant Control Supporting Apparatus]

Figure 2:
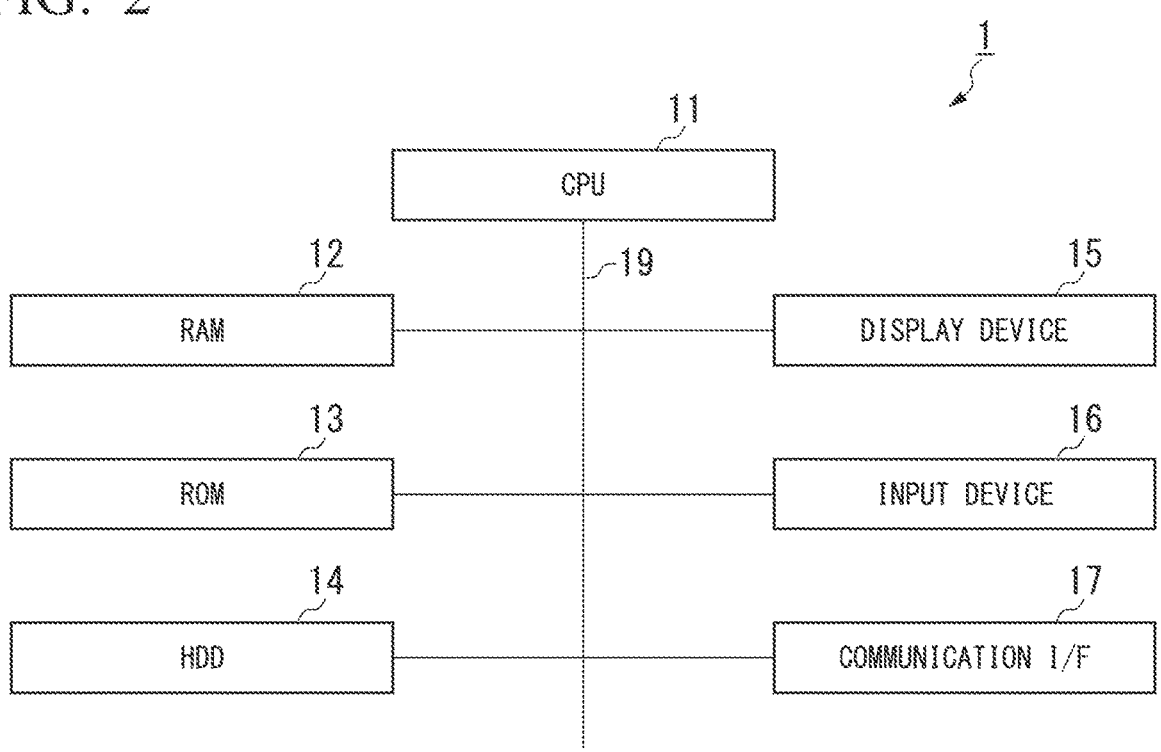
FIG. 2 is a block diagram showing the hardware configuration of the plant control supporting apparatus according to the first embodiment of the present invention.

Next, one example of the hardware configuration of the plant control supporting apparatus 1 will be described with reference to drawings. FIG. 2 is a block diagram showing the hardware configuration of the plant control supporting apparatus 1 according to the first embodiment of the present invention As shown in the drawing, the plant control supporting apparatus 1 includes a central processing unit (CPU) 11, a random access memory (RAM) 12, a read only memory (ROM) 13, a hard disk drive (HDD) 14, a display device 15, an input device 16, a communication interface (I/F) 17, and a bus 19 connecting these components.

The plant control supporting apparatus 1 includes, for example, a server apparatus, a general-purpose computer such as a desktop-type PC, an FA computer, an apparatus such as a PLC, a computer of a notebook-type or a tablet type, a PDA, a smartphone, or the like. The plant control supporting apparatus 1 replaces (or assists with) an operation of a board operator and. The plant control supporting apparatus 1 may be installed, for example, near a monitoring terminal (not shown in the drawings) monitored by the board operator.

The CPU 11 executes a program stored in the RAM 12, the ROM 13, or the HDD 14, thereby controlling the plant control supporting apparatus 1. The CPU 11 executes a plant control supporting program used for realizing the operation of the plant control supporting apparatus 1 to be described later. The plant control supporting program, for example, is acquired from a recording medium in which the plant control supporting program is recorded, a server providing the plant control supporting program through a network, or the like, is installed in the HDD 14, and is stored in the RAM 12 to be readable from the CPU 11.

The display device 15, for example, is a device having a display function such as a liquid crystal display. The display device 15 may be realized by any one of devices of various forms such as a head-mount type display, a glasses-type display, and a wristwatch-type display.

The input device 16, for example, is a device having an input function such as a keyboard or a mouse. The input device 16 may be a device such as a microphone into which audio information is input, a camera into which image information is input, or the like.

The display device 15 and the input device 16, for example, may be realized by a device having a display function and an input function such as a touch panel.

The communication I/F 17 controls communication with other apparatuses such as the manufacturing execution system 3, the operation control apparatus 4, the maintenance device 6, and the field operator terminal 7 through wired communication or wireless communication. The communication I/F 17 performs communication control of data transmission and reception, voice calls, or electronic mail transmission and reception for other connected apparatuses.

The communication I/F 17, for example, may perform communication control corresponding to communication standards specific to industrial instruments such as ISA 100 that is a radio communication standard of the International Society of Automation (ISA), Highway Addressable Remote Transducer (HART) (registered trademark), BRAIN (registered trademark), FOUNDATION Fieldbus, PROFIBUS, or the like. The communication I/F 17 may perform communication control corresponding to general-purpose communication standards such as wireless LAN communication, wired LAN communication, infrared communication, or a short-distance radio communication.

[Software Configuration of Plant Control Supporting Apparatus]

Figure 3:
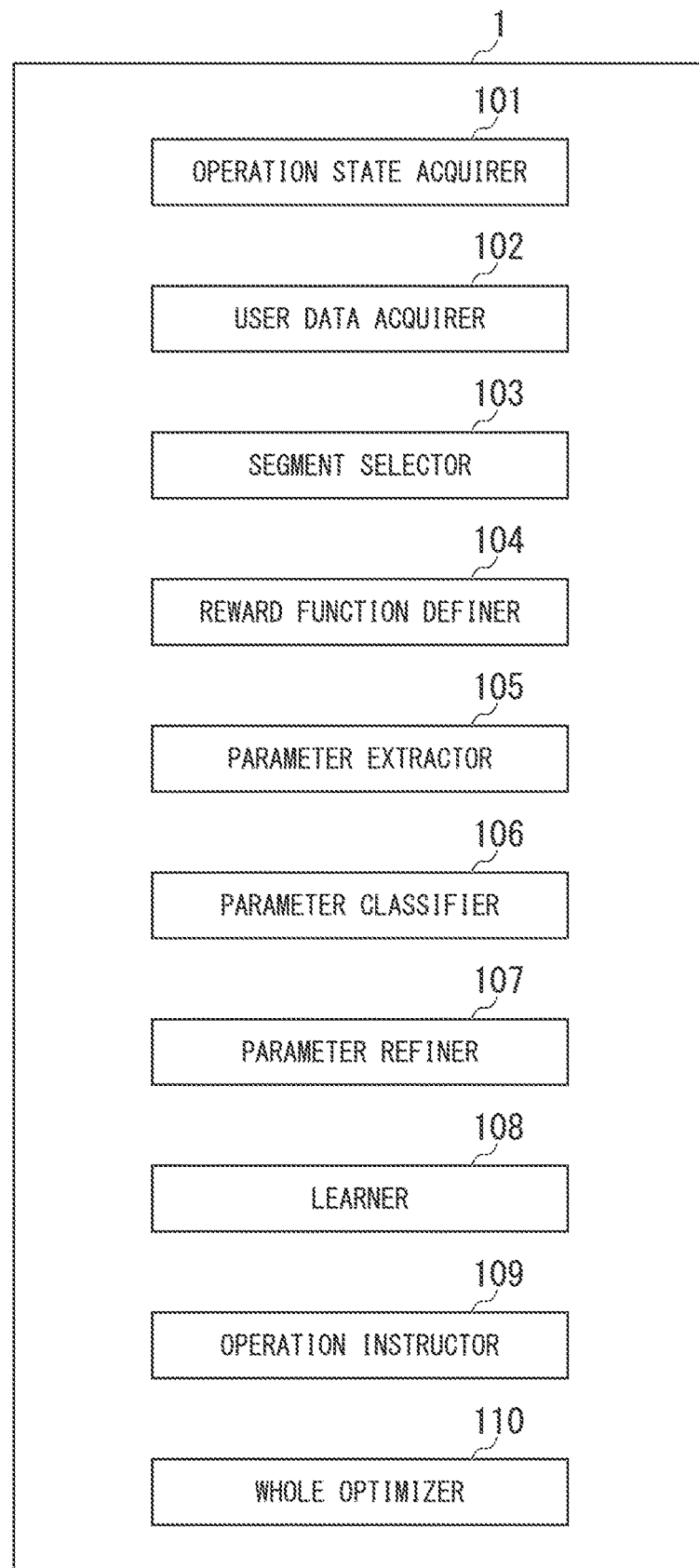
FIG. 3 is a block diagram showing the software configuration of the plant control supporting apparatus according to the first embodiment of the present invention.

Next, one example of the software configuration of the plant control supporting apparatus 1 will be described with reference to drawings. FIG. 3 is a block diagram showing the software configuration of the plant control supporting apparatus 1 according to the first embodiment of the present invention.

As shown in the drawing, the plant control supporting apparatus 1 includes an operation state acquirer 101, a user data acquirer 102, a segment selector 103, a reward function definer 104, a parameter extractor 105, a parameter classifier 106, a parameter refiner 107, a learner 108, an operation instructor 109, and a whole optimizer 110.

The operation state acquirer 101 acquires the operation state of the plant device P0. In the present embodiment, the operation state of the plant device P0 is represented using measured values of the monitors M1 to M5, valve opening of the valves V1 to V8, and the like. The operation state acquirer 101, for example, acquires the measured values by requesting acquisition of the measured values from the monitors M1 to M5 and acquires the valve opening by requesting acquisition of the valve opening from the valves V1 to V8. The operation state acquirer 101 sequentially records the acquired operation states.

The user data acquirer 102 acquires various kinds of user data. The user data described here represents the I/O diagram, the segment diagram, the alarm setting definition data, and the parameter provisional initial value data described above and reward function definition data to be described later, and the like.

The segment selector 103 selects a segment for which learning for acquiring optimal values of parameters representing an operation state is executed among segments included in the plant device P0. The segment described here represents the range of a part of the plant device P0 and, for example, is defined by dividing the plant device P0 into segments in units of control loops.

The segment selector 103 sequentially selects a segment in accordance with the flow of the process in the plant device P0. In other words, the segment selector 103, for example, in a plurality of segments included in the plant device P0, sequentially selects adjacent segments from a segment in a further downstream process to a segment in a further upstream process in a series of processes of the plant device P0. In other words, the segment selector 103, in a plurality of segments included in the plant device P0, selects a first segment in a first process, and then selects a second segment in a second process in the upstream of the first segment.

The segment selector 103 may be configured to sequentially select adjacent segments from a segment in a further upstream process to a segment in a further downstream process.

The dividing of the plant device P0 into segments and the selecting of the segments will be described later in detail.

The reward function definer 104 defines a reward and penalty function used for learning for acquiring optimal values of parameters representing the operation state of a field device of the plant device P0.

The definition of the reward and penalty function will be described later in detail.

The parameter extractor 105 extracts parameters that are learning targets in a selected segment on the basis of the above-described I/O diagram representing input and output information of a field device corresponding to the parameters, the above-described segment diagram representing information representing the configuration and the arrangement of the field device and the like (segment information), and the like.

The parameter classifier 106 classifies the parameters extracted by the parameter extractor 105 into variable parameters inside the segment, monitor parameters inside the segment, variable parameters outside the segment, or fixed parameters outside the segment on the basis of the I/O diagram and the segment diagram.

The parameter refiner 107 specifies and deletes (excludes) parameters not contributing to the purpose of maximizing the reward and penalty function on the basis of the segment diagram among the parameters extracted by the parameter extractor 105 and classified by the parameter classifier 106. Alternatively, the parameter refiner 107 prioritizes the parameters in which optimal values are acquired in the learner 108. In this way, parameters that are learning targets are refined.

A parameter not contributing to the purpose of maximizing the reward and penalty function, for example, is a parameter associated with a field device not connected to a monitor measuring the yield of products (final products) of the plant device P0 (in other words, having no influence or a little influence on the measured values of the monitor).

The parameter refiner 107 generates a relationship model representing the relationship between parameters that is information for causing learning using the learner 108 to easily converge on the basis of the segment diagram, i.e., information facilitating the convergence.

The parameter refiner 107 may generate a relationship model representing the relationship between parameters for all the parameters classified by the parameter classifier 106 on the basis of the segment diagram without deleting (excluding) parameters specified on the basis of the segment diagram as described above or giving priority to parameters.

The learner 108 performs learning for acquiring optimal values of parameters extracted by the parameter extractor 105 on the basis of the reward and penalty function for each segment. The learner 108 performs learning of relationship probabilities among parameters on the basis of the relationship model generated by the parameter refiner. The learner 108 performs learning for acquiring optimal values of the parameters on the basis of the relationship probabilities.

The operation instructor 109 outputs an operation instruction used for giving an instruction for operating the plant device P0 on the basis of parameter values of the parameters determined by learning using the learner 108. The operation instructor 109 outputs the operation instruction to a field device or a field operator. For example, the operation instructor 109 outputs a current value of 4 to 20 mA or a digital signal to the operation control apparatus 4 in accordance with valve opening of the valves V1 to V8 determined by the learner 108. The operation instructor 109 outputs operation instructions representing valve opening of the valves V1 to V8 determined by learning using the learner 108.

The output of the operation instructions is performed at a predetermined timing. For example, the output of the operation instructions for the operation control apparatus 4 is immediately performed at a time point at which the parameters are determined. On the other hand, for example, the output of an operation instruction for a field operator is performed by transmitting the operation instruction to the field operator terminal 7 (for example, by means of electronic mail) at predetermined intervals.

The operation instructor 109 outputs an operation instruction to a field device or a field operator, whereby the plant control supporting apparatus 1 can reduce (or eliminate) the operation load of the board operator. The operation instructor 109 may notify the board operator of the content of the operation instruction by displaying the content on the display device 15 shown in FIG. 2.

In a case in which the board operator determines that there is a problem in the notified operation instruction, the board operator may give an instruction of a change or stop of the operation instruction to the operation instructor 109 through the input device 16, for example, using an electronic mail or the like.

The whole optimizer 110 performs learning of acquiring a whole optimization value of a parameter representing the operation state of the whole plant (all the segments) on the basis of a parameter value of each parameter determined through learning performed for each segment.

In FIG. 3, a case in which each of the functions of the operation state acquirer 101, the user data acquirer 102, the segment selector 103, the reward function definer 104, the parameter extractor 105, the parameter classifier 106, the parameter refiner 107, the learner 108, the operation instructor 109, and the whole optimizer 110 is realized by software has been described. However, one of more of the functions described above may be realized by hardware.

A configuration in which each of the functions described above is divided into a plurality of functions and performed is also possible. Two or more of the functions described above may be integrated into one function to be executed.

[Operation of Plant Control Supporting Apparatus]

Figure 4:
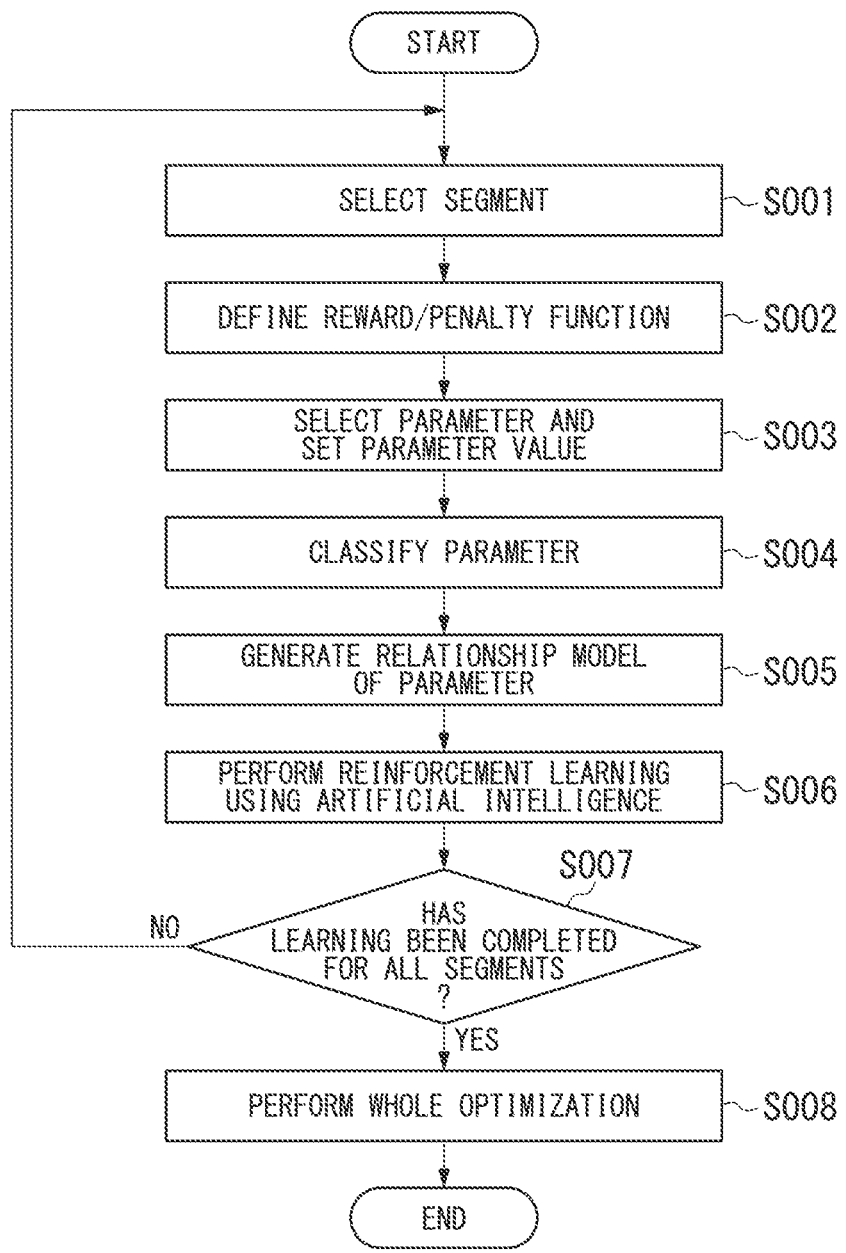
FIG. 4 is a flowchart showing the operation of the plant control supporting apparatus according to the first embodiment of the present invention.

Next, one example of the operation of the plant control supporting apparatus 1 will be described with reference to drawings. FIG. 4 is a flowchart showing the operation of the plant control supporting apparatus 1 according to the first embodiment of the present invention.

A process represented by this flowchart is started, for example, when the power of the plant control supporting apparatus 1 is turned on.

(Step S001) The segment selector 103 selects one segment that is an execution target of learning for acquiring optimal values of parameters representing the operation state among a plurality of segments included in a plant device (for example, the plant device P0 shown in FIG. 1). Thereafter, the process proceeds to Step S002.

(Step S002) The reward function definer 104 defines a reward and penalty function used for learning for acquiring the optimal values of the parameters representing the operation state. Thereafter, the process proceeds to Step S003.

(Step S003) The parameter extractor 105 extracts parameters (items of parameters, for example, parameter names) that are learning targets, which are included in the segment selected in Step S001, on the basis of the I/O diagram and the segment diagram. The parameter extractor 105 sets parameter values of the extracted parameters (for example, sets parameter values on the basis of the parameter provisional initial value data). Thereafter, the process proceeds to Step S004.

(Step S004) The parameter classifier 106 classifies the parameter extracted in Step S003 into "variable parameters inside the segment," "monitor parameters inside the segment," "variable parameters outside the segment," or "fixed parameters outside the segment" on the basis of the 110 diagram and the segment diagram. Thereafter, the process proceeds to Step S005.

(Step S005) By deleting (excluding) parameters that are not effective for maximizing the reward and penalty function defined in Step S002 on the basis of the segment diagram, the parameter refiner 107 refines the parameters into effective parameters. Alternatively, the parameter refiner 107 prioritizes the parameters in which optimal values are acquired in the learner 108, and sets the priority level of a more effective parameter to a higher level. The parameter refiner 107 generates a relationship model representing the relationship between parameters that is information for causing the learning performed by the learner 108 to easily converge on the basis of the segment diagram. Thereafter, the process proceeds to Step S006.

(Step S006) The learner 108 acquires the reward and penalty function defined in Step S002, parameter names of the parameters that are classified in Step S004 and are refined in Step S005, parameter values of the parameters (set in Step S003), and the relationship model generated in Step S005. Then, the learner 108 performs reinforcement learning using artificial intelligence for acquiring an optimal value of the parameter representing the operation state using the acquired information. Thereafter, the process proceeds to Step S007.

(Step S007) In a case in which the learning for acquiring an optimal value of the parameter representing the operation state is completed for all the segments of the plant device, the process proceeds to Step S008. Otherwise, the process is returned to Step S001.

(Step S008) The whole optimizer 110 performs learning for acquiring whole optimal values of parameters representing the operation state of the whole plant device using the parameter values of the parameters determined through the learning in Step S006.

Thus ends the process of this flowchart.

[Configuration of I/O Diagram]

Next, one example of the configuration of the I/O diagram will be described with reference to drawings. FIG. 5 is a diagram showing the configuration of the I/O diagram used by the plant control supporting apparatus 1 according to the first embodiment of the present invention.

As shown in the drawing, the I/O diagram according to the present embodiment is data of a two-dimensional table form including columns of nine items including "Device ID," "Device type," "Installation location," "Control loop name," "I/O type," "IOP lower limit value," "IOP upper limit value," "Unit," and "Device importance level."

The "Device ID" represents an identifier (ID) used for identifying a field device included in the plant device P0.

The "Device type" represents a type of field device identified by the device ID. The type of a field device, for example, is a monitor of a pressure gauge, a thermometer, or the like, a valve, or the like.

The "Installation location" represents a place in which a field device identified by the device ID is installed in the plant.

The "Control loop name" represents a name of a control loop in which a field device identified by the device ID is included among control loops included in the plant device P0. In the present embodiment, the plant device P0 is divided into segments in units of control loops.

The "I/O type" represents whether a field device identified by the device ID is an input device (for example, a monitor) inputting a parameter value to the plant control supporting apparatus 1 or an output device (for example, an operation of a valve or the like) that acquires a parameter value output from the plant control supporting apparatus 1 and operates.

The "IOP (input and output processor) lower limit value" represents a lower limit threshold for which a parameter value (for example, a monitor value) of a field device identified by the device ID is determined as being abnormal. In other words, in a case in which the parameter value of a field device is below this IOP lower limit value, a predetermined alarm is generated on the basis of a predetermined condition.

The "IOP upper limit value" represents an upper limit threshold for which a parameter value (for example, a monitor value) of a field device identified by the device ID is determined as being abnormal. In other words, in a case in which the parameter value of a field device is above this IOP upper limit value, a predetermined alarm is generated on the basis of a predetermined condition.

The "Unit" represents a unit of a parameter value (for example, a monitor value or valve opening) of a field device identified by the device ID. In a case in which the field device is a pressure gauge, the unit, for example, is "hectopascal (hPa)" or the like. On the other hand, in a case in which the field device is a thermometer, the unit, for example, is "° C. (degree Celsius)" or the like. In a case in which the field device is a valve, the unit, for example, is "% (percent)" (a ratio for maximum opening).

The "Device importance level" represents an importance level of a field device identified by the device ID. An alarm importance level to be described later is set on the basis of this importance level, and the alarm importance level is reflected on the definition of a penalty function to be described later.

The device importance level, for example, is set by using a degree of influence of a parameter of the device on the plant device P0 and the yield of segments or a degree of influence of a possibility of the plant device P0 or each segment being stopped.

[Configuration of Alarm Setting Definition Data]

Next, one example of the configuration of the alarm setting definition data will be described with reference to drawings. FIG. 6 is a diagram showing the configuration of the alarm setting definition data used by the plant control supporting apparatus 1 according to the first embodiment of the present invention. As shown in FIG. 6, the alarm setting definition data according to the present embodiment is data of a two-dimensional table form in which an importance level of an alarm determined in accordance with "Device importance level" and "Control loop" defined in the I/O diagram shown in FIG. 5 is defined.

The importance level of an alarm, for example, for each control loop, has a different influence level on the plant device P0 or the yield of segments or a different influence level of the possibility of the plant device P0 or each segment being stopped, and thus, the importance level of an alarm is defined with an importance level of the control loop in which the device is included being considered in addition to the device importance level.

For example, in the I/O diagram shown in FIG. 5, a control loop name of a control loop in which a field device of which "Device ID" is "P1234" is included is "Loop 1," and "Device importance level" of the field device of which "Device ID" is "P1234" is "low." In the alarm setting definition data shown in FIG. 6, in a case in which "Control loop name" is "Loop 1," and "Device importance level" is "low," the alarm importance level is "low." Accordingly, the plant control supporting apparatus 1 can recognize that the alarm importance level of the field device, of which "Device ID" is "P1234," included in "Loop 1" is "low."

Similarly, for example, in the I/O diagram shown in FIG. 5, a control loop name of a control loop in which a field device of which "Device ID" is "P1245" is included is "Loop 4," and "Device importance level" of the field device of which "Device ID" is "P1245" is "high." In addition, in the alarm setting definition data shown in FIG. 6, in a case in which "Control loop name" is "Loop 4," and "Device importance level" is "high," the alarm importance level is "middle." Accordingly, the plant control supporting apparatus 1 can recognize that the alarm importance level of the field device, of which "Device ID" is "P1245," included in "Loop 4" is "middle."

In addition, in the alarm setting definition data shown in FIG. 6, for example, in a case in which "Control loop name" is "Loop 3," and "Device importance level" is "low," the alarm importance level is "no display." In a case in which the alarm importance level of a certain field device is "no display," the reward function definer 104 does not include an alarm of the field device in a penalty function in the definition of the reward and penalty function.

[Learning for Acquiring Optimal Value of Parameter Representing Operation State]

Figure 7:
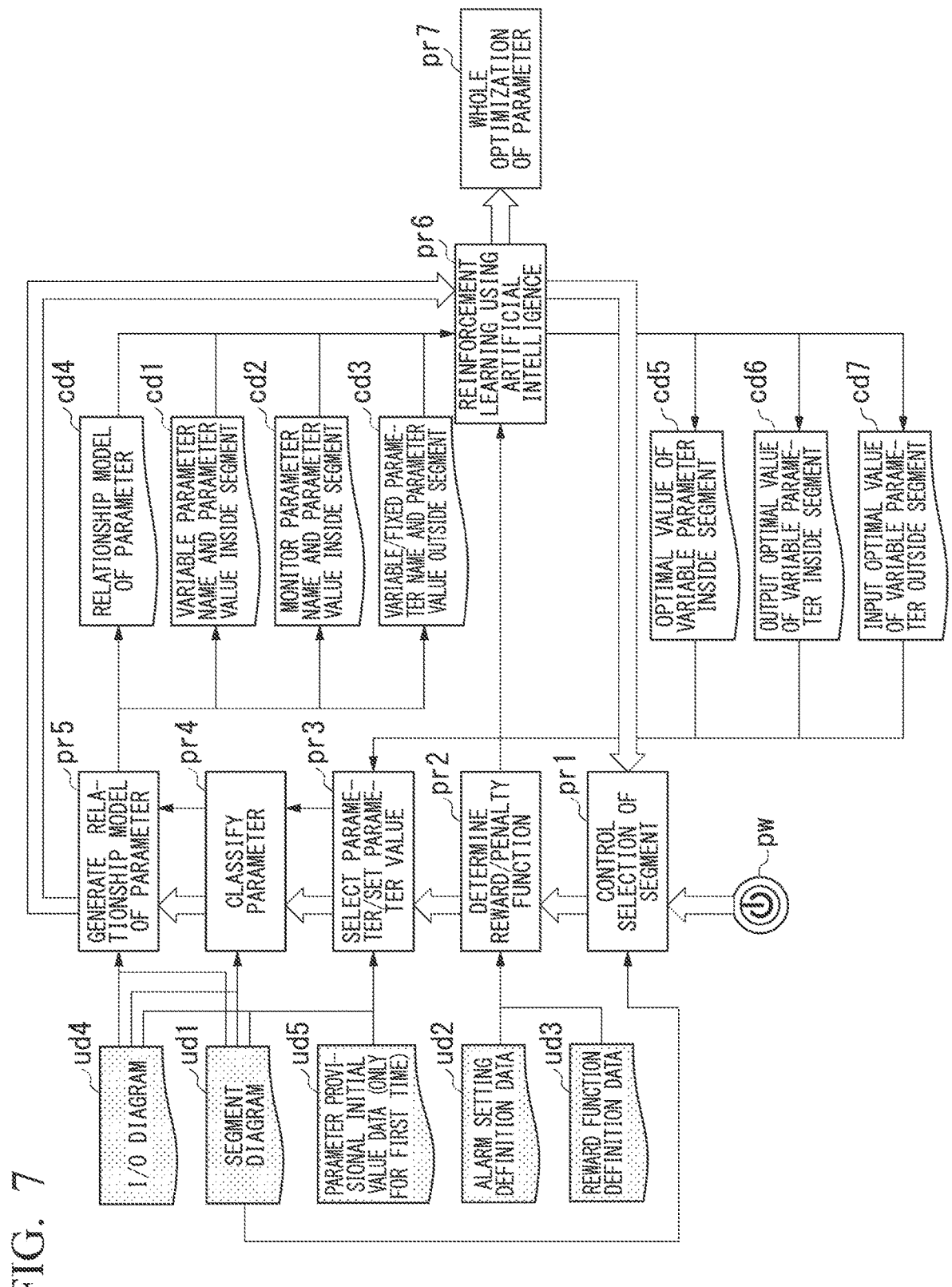
FIG. 7 is a schematic diagram showing learning parameters using the plant control supporting apparatus according to the first embodiment of the present invention.

Next, the process of learning for acquiring optimal values of parameters representing an operation state will be described in more detail with reference to drawings. FIG. 7 is a schematic diagram showing learning parameters using the plant control supporting apparatus 1 according to the first embodiment of the present invention.

As shown in the drawing, the learning of parameters using the plant control supporting apparatus 1 according to the present embodiment is executed using processes pr1 to pr7 representing processes in the learning, user data ud1 to user data ud5 representing information given by a user (a system manager, an operator, or the like), calculation data cd1 to calculation data cd7 generated in the processes pr1 to pr7, and the power pw of the plant control supporting apparatus 1.

A plant device according to the present embodiment (for example, the plant device P0 shown in FIG. 1) includes a plurality of segments. A segment, as described above, represents the range of a part of the plant device. In the present embodiment, segments are defined by dividing a plant device into the segments in units of control loops.

In addition, a segment may be defined by a user (a system manager, an operator, or the like) and may be defined by a computer program (for example, a control loop is recognized from the I/O diagram, the segment diagram, or the like, and the plant device is divided into segments in units of control loops).

As shown in FIG. 7, first, when the power pw of the plant control supporting apparatus 1 is turned on, the segment selector 103 executes the process of pr1 of selecting one segment that is an execution target of learning for acquiring optimal values of parameters representing an operation state among a plurality of segments configuring a plant device (for example, the plant device P0 shown in FIG. 1).

At the time of first selection, a segment designated by a user is selected. For example, a user (board operator) makes an input through the input device 16 shown in FIG. 2, or a user (field operator) makes an input through the field operator terminal 7 shown in FIG. 1, whereby a segment is designated.

In the present embodiment, a segment selected at the first time is a segment in which a monitor measuring the yield of products (final products) of the plant device P0 is included. For example, a segment selected at the first time is a segment in which a monitor M1 measuring the yield of "hydrogen" that is a final product is included in the plant device P0 shown in FIG. 1.

When the segment is selected, the reward function definer 104 executes the process pr2 defining a reward and penalty function used for learning for acquiring optimal values of parameters representing an operation state.

The reward and penalty function is a function combining a reward function and a penalty function.

The reward function definer 104 outputs the reward and penalty function defined in the process pr2 to the learner 108.

The reward function is a function defined for an object to be optimized in a plant device that is an optimization target (for example, the yield of a product is to be maximized, the quality of a product is to be configured best, or the stability (security) of a plant operation is to be maximized).

The reward function is defined in advance in user data ud3 (reward function definition data) by the user. For example, a user (board operator) makes an input through the input device 16 shown in FIG. 2, or a user (field operator) makes an input through the field operator terminal 7 shown in FIG. 1, whereby a reward function is defined in the user data ud3 (reward function definition data).

For example, by setting m1 and m2 as measured values of the yields of products and setting a1 as a value of an alarm, for example, a reward function for maximizing the yield of products may be defined as "Max(m1)," a reward function for setting the quality of products to be best may be defined as "m1/m2=50%," or a reward function for setting the stability (security) of the operation of the plant to be best may be defined as "10<m1<20, a1=0."

In addition, the plant control supporting apparatus 1 may execute learning such that, by using a plurality of combinations of rewards as one reward function, a combination of the plurality of reward functions is optimized. For example, by defining the reward function as being "m1+1/(m1/m2−50%)," a reward function for forming a state in which m1/m2 is closest to 50% (best quality) while maximizing m1 (maximizing the yield) to be a best state can be defined.

A penalty function is a function for decreasing a value of the reward function by generating the alarm (the value of the alarm). The penalty function is generated automatically or semi-automatically from the user data ud2 (alarm setting definition data).

For example, it is assumed that the values a1 to a3 of the alarms are defined in the user data ud2 (alarm setting definition data), and a1 is "(alarm priority level) high," a2 is "(alarm priority level)" middle, and a3 is "(alarm priority level) low." In this case, for example, by defining the penalty function as being "−a1*100−a2*10−a3*1," a penalty function that is weighted such that the reward function is decreased more as the alarm priority level is higher can be defined.

By combining the reward function and the penalty function described above, the reward function definer 104, for example, defines the reward and penalty function F(x) as being "F(x)=m1+/(m1/m2−50%)−a1*100−a2*10−a3*1."

When the reward and penalty function is determined, the parameter extractor 105 executes the process pr3 of extracting parameters, which are learning targets, included in the selected segment (in the process pr1). The parameters are extracted on the basis of information such as "Control loop name," "Installed place," and the like included in the user data ud1 (the segment diagram) and the user data ud4 (the I/O diagram). The extraction of parameters may be performed by a user (a system manager, an operator, or the like).

At the first time, the parameter extractor 105 acquires parameter provisional initial values set in advance for the extracted parameters from the user data ud5 (parameter provisional initial value data).

When the parameters are extracted, and the parameter provisional initial values of the extracted parameters are acquired, the parameter extractor 105 outputs a list of the parameters and a parameter provisional initial value of each of the parameters to the parameter classifier 106.

The parameter classifier 106 executes the process pr4 of classifying the acquired parameters on the basis of the user data ud1 (the segment diagram) and the user data ud4 (the I/O diagram).

The parameter classifier 106 classifies the acquired parameters into "a variable parameter inside the segment," "a monitor parameter inside the segment," "a variable parameter outside the segment," or "a fixed parameter outside the segment."

The "variable parameter inside the segment" is a parameter, of which a parameter value can be controlled, present inside the segment. While the "variable parameter inside the segment," mainly, in the user data ud4 (I/O diagram), for example, corresponds to a field device (output device) represented as a "valve," other than that, for example, a manual valve may be included.

The "monitor parameter inside the segment" is a parameter, which is used for monitoring (the parameter value cannot be controlled), present inside the segment. The "monitor parameter inside the segment" is, mainly, in the user data u4d (I/O diagram), for example, corresponds to a field device (input device) represented as a "thermometer," a "pressure gauge" or a "flowrate meter."

The "variable parameter outside the segment" and the "fixed parameter outside the segment" are parameters representing exchange with other adjacent segments.

The "variable parameter outside the segment" is a parameter of which a parameter value can be controlled by adjusting other segments. The "variable parameter outside the segment," includes a parameter representing an input value input to a selected segment from another adjacent segment and a parameter representing an output value output from a selected segment to another adjacent segment.

The "fixed parameter outside the segment" is a parameter of which a parameter value cannot be controlled. The "fixed parameter outside the segment" is a parameter representing an input value input to a selected segment from another adjacent segment, a parameter representing an output value output from a selected segment to another adjacent segment, or a parameter representing the yield of final products that are targets for optimization through learning.

The selection of a segment and the classification of parameters will be described later in detail.

When the parameters are classified, the parameter refiner 107 deletes (excludes) parameters that are not effective for maximizing the reward and penalty function on the basis of the segment diagram, thereby refining the parameters into effective parameters. Alternatively, the parameter refiner 107 prioritizes parameters in which optimal values are acquired in the learner 108 and sets a high priority level to more effective parameters. The parameter refiner 107 executes the process pr5 of generating a relationship model representing the relationship between parameters that is information for causing learning using the learner 108 to easily converge on the basis of the segment drawing.

In a case in which learning for acquiring optimal values of parameters representing the operation states using the learner 108 is executed, when refining of the parameters using the parameter refiner 107 or the generation of a relationship model representing the relationship between the parameters is not performed, the learner 108 needs to search an optimal value while changing the parameter values of all the parameters (variable parameters) of which the parameter values can be controlled.

However, in such a case, although there are cases in which optimal values can be acquired in a relatively short time, depending on the situations, when the number of variable parameters is increased, the number of combinations of parameter values to be adjusted becomes very large, and accordingly, there are cases in which a long time is required for the learning to converge, the learning does not converge, the learning converges to be a local optimum, or the like. For this reason, the parameter refiner 107, as described above, refines the parameters into effective parameters by deleting (excluding) parameters that are not effective for maximizing the reward and penalty function (or prioritizing parameters in which optimal values are acquired in the learner 108), executes the process pr5 of generating a relationship model representing the relationship between parameters, and outputs the refined parameters and the generated relationship model to the learner 108.

The calculation of relationship probabilities between parameters using the relationship model will be described later in detail.

The learner 108 acquires calculation data cd1 to calculation data cd4 from the parameter refiner 107. The calculation data cd1 to calculation data cd3 may be acquired also from the parameter classifier 106. Then, the learner 108 executes a process of pr6 of performing reinforcement learning using artificial intelligence by using the acquired data and the reward and penalty function acquired from the reward function definer 104. The calculation data cd1 is names of variable parameters inside the segment and parameter values thereof. The calculation data cd2 is names of monitor parameters inside the segment and parameter values thereof. The calculation data cd3 is names of variable parameters outside the segment, names of fixed parameters, parameter values thereof. The calculation data cd4 is a relationship model representing the relationship between parameters.

The reinforcement learning using artificial intelligence is performed using technologies in the related art. The learner 108 performs the process of learning while changing the parameter values of the variable parameters inside the segment and the outside the segment on the basis of the calculation data cd1 to the calculation data cd4 and optimizes the parameter values.

When the optimization of the parameter values of the parameters in the segment selected first by the learner 108 is completed, the learner 108 outputs calculation data cd5 to calculation data cd7 to the parameter extractor 105. The calculation data cd5 is optimal values (optimized parameter values) of variable parameters inside the segment. The calculation data cd6 is output optimal values of variable parameters outside the segment (optimal values of variable parameters of a field device that are output to the outside of the segment). The calculation data cd7 is input optimal values of variable parameters outside the segment (optimal values of variable parameters of a field device that are input from the outside of the segment).

When the optimization of parameter values of the parameters in the segment selected first by the learner 108 is completed, the segment selector 103 re-executes the process pr1 of selecting one segment adjacent to the segment selected first described above (in other words, a segment in a process of the one-stage upstream side in the plant device P0).

When the segment is selected, the reward function definer 104 re-executes the process pr2 of determining a reward and penalty function used for learning for acquiring optimal values of parameters representing operation states.

When the reward and penalty function is determined, the parameter extractor 105 re-executes the process pr3 of extracting parameters, which are learning targets, included in the selected segment (in the process pr1).

When the parameters are extracted, and parameter values of the extracted parameters are acquired, the parameter extractor 105 outputs a list of the parameters and parameter values of the parameters to the parameter classifier 106. The parameter classifier 106 re-executes the process pr4 of classifying the acquired parameters on the basis of the user data ud1 (the segment diagram) and the user data ud4 (the I/O diagram).

The parameter classifier 106 classifies the acquired parameters into "a variable parameter inside the segment," "a monitor parameter inside the segment," "a variable parameter outside the segment," or "a fixed parameter outside the segment."

Parameters corresponding the "variable parameters outside the segment" optimized at the time of learning in the segment selected in the previous time (here, the first time) are classified into "fixed parameters outside the segment" in the learning in the segment selected this time. In other words, in the learning in a segment of this time, parameter values of variable parameters are optimized by the learner 108 on the condition that parameter values of the parameters optimized the learning in an adjacent segment selected in the previous time are satisfied.

When the parameters are classified, the parameter refiner 107 refines the parameters into effective parameters by deleting (excluding) parameters that is not effective for maximizing the reward and penalty function on the basis of the segment diagram. Alternatively, the parameter refiner 107 prioritizes parameters in which optimal values are acquired in the learner 108 and sets high priority levels to more effective parameters. The parameter refiner 107 re-executes the process pr5 of generating a relationship model representing the relationship between parameters, which is information for causing the learning using the learner 108 to easily converge on the basis of the segment diagram.

When the learner 108 acquires the calculation data cd1 to the calculation data cd4 from the parameter refiner 107, the learner 108 re-executes the process pr6 of performing reinforcement learning using artificial intelligence by using the acquired data.

When the optimization of the parameter values of the variable parameters in the segment selected by the learner 108 is completed, the learner 108 outputs calculation data cd5 to calculation data cd7 to the parameter extractor 105.

In this way, the process p1 to the process p6 described above are repeated until the learning is executed for all the segments included in the plant device.

When the execution of the learning for all the segments is completed, the whole optimizer 110 executes the process pr7 of learning for acquiring whole optimal values of parameters representing the operation state of the whole plant device using the parameter values of the parameters determined through the learning.

As described above, when the number of variable parameters is increased, the number of combinations of parameter values to be adjusted becomes very large, and accordingly, there are cases in which a long time is required for the learning to converge, the learning does not converge, the learning easily converges to be a local optimum, and the like.

However, the plant control supporting apparatus 1 according to the present embodiment, first, divides the plant device into segments and achieves the optimization of parameter values of the parameters for each of the segments. Thereafter, the plant control supporting apparatus 1 sets the parameter values of the parameters optimized for each segment as initial values of the parameters and, this time, performs the whole optimization of parameter values of parameters for the whole plant device including all the segments. Accordingly, learning can be performed using parameter values that have already been partially optimized for each segment as parameter provisional initial values, and thus, the plant control supporting apparatus 1 according to the present embodiment can cause learning for acquiring the whole optimization values of the parameters representing the operation state of the whole plant device to easily converge in a shorter time.

[Selection of Segment]

Figure 8:
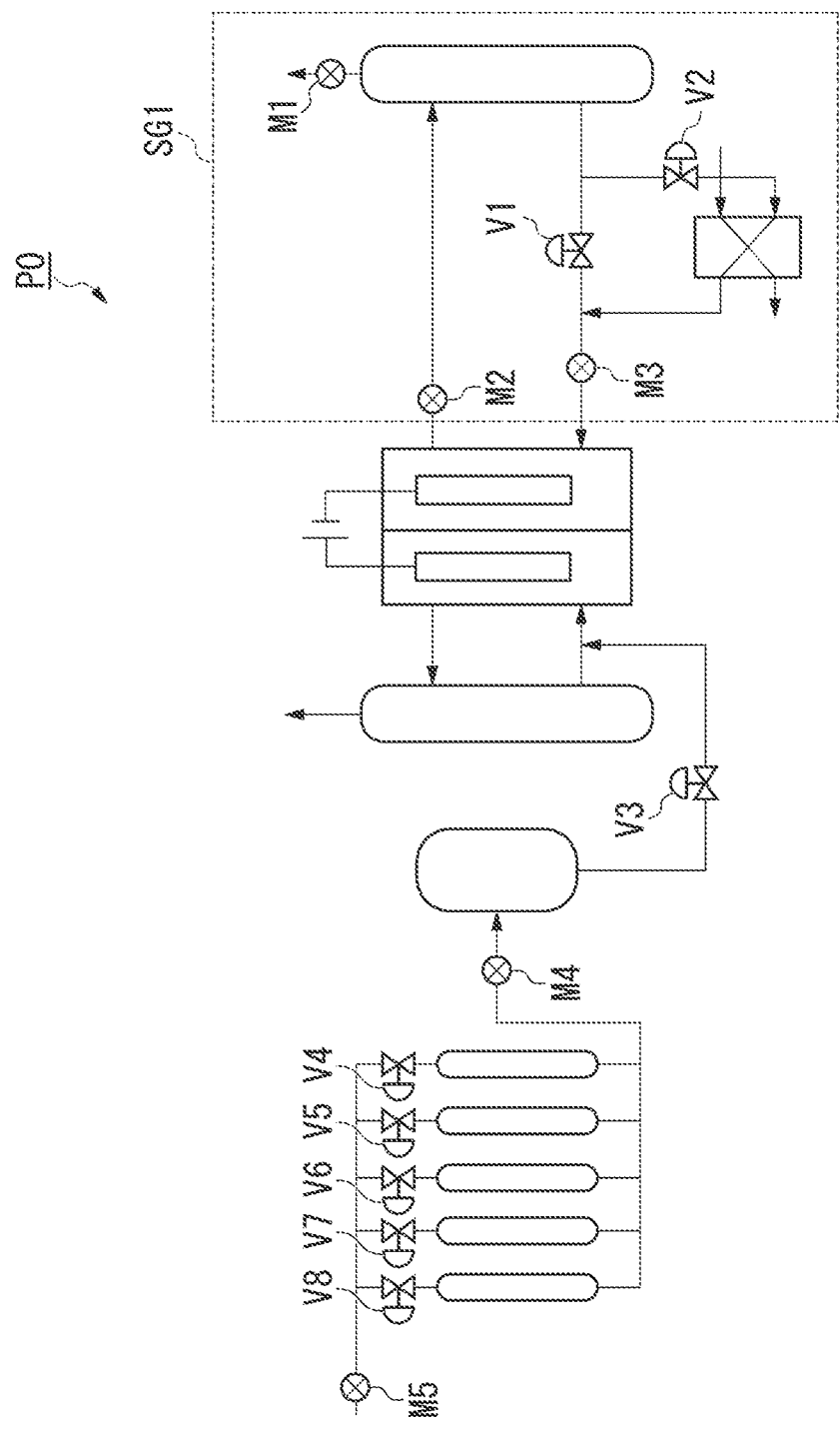
FIG. 8 is a diagram showing selection of a segment using the plant control supporting apparatus according to the first embodiment of the present invention.
Figure 9:
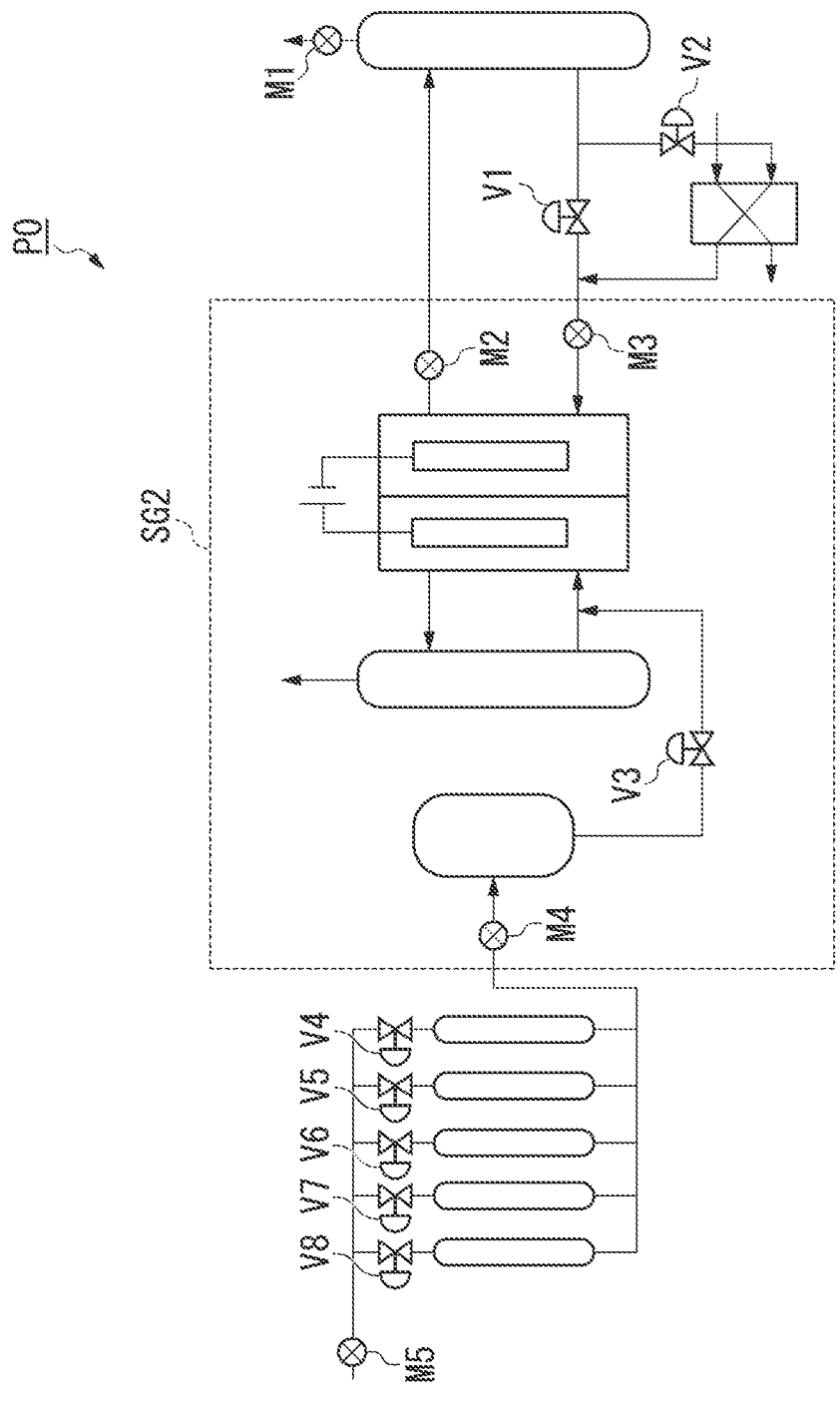
FIG. 9 is a diagram showing selection of a segment using the plant control supporting apparatus according to the first embodiment of the present invention.
Figure 10:
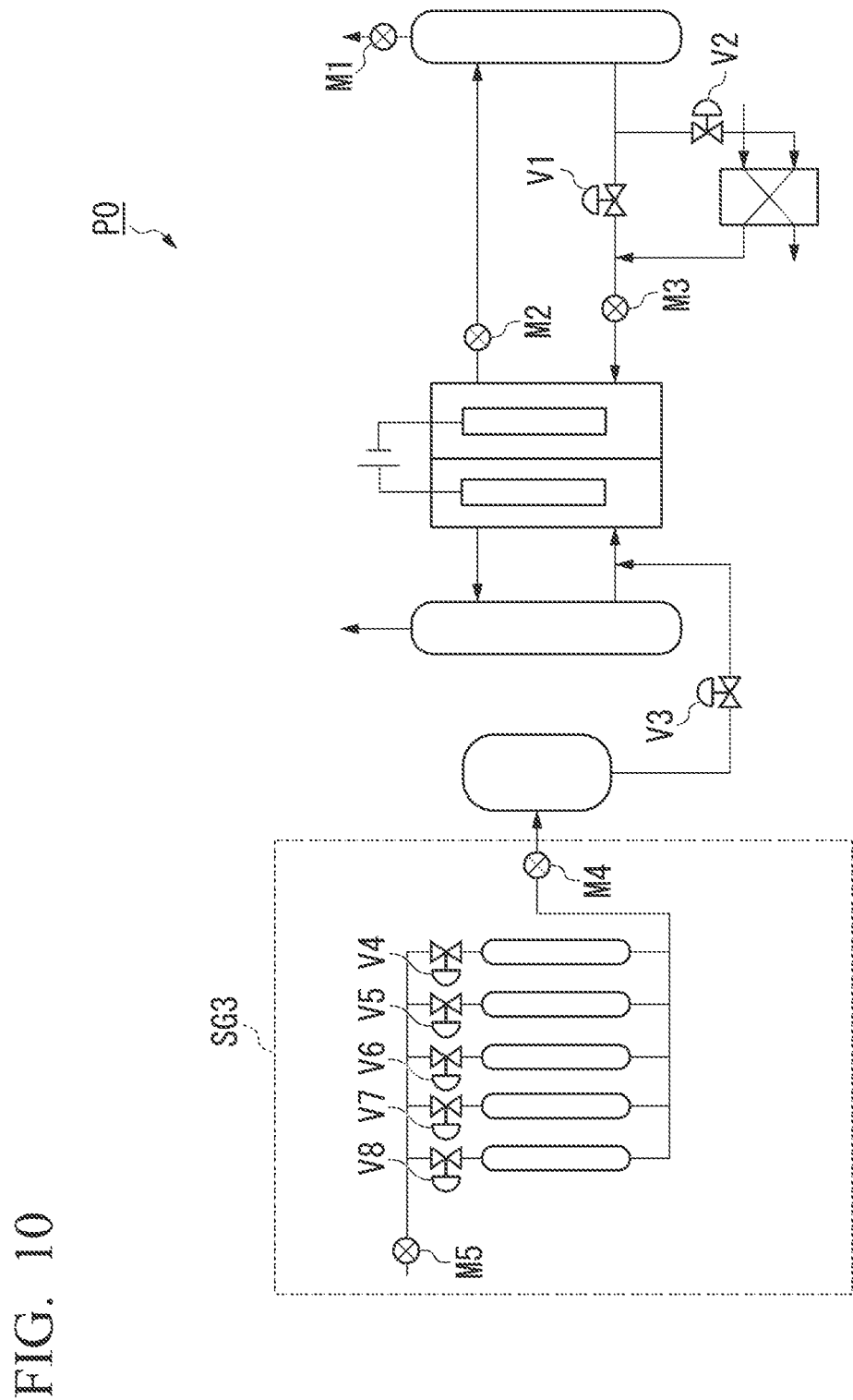
FIG. 10 is a diagram showing selection of a segment using the plant control supporting apparatus according to the first embodiment of the present invention.

Next, selection of a segment will be described with reference to drawings. FIGS. 8 to 10 are diagrams showing selection of a segment using the plant control supporting apparatus 1 according to the first embodiment of the present invention. FIGS. 8 to 10 show the configuration of the plant device P0 in the plant 100 shown in FIG. 1. Hereinafter, the selection of a segment will be described in the case of the plant device P0 shown in FIG. 1 as an example.

As described above, the segment selector 103 divides the plant device P0 into segments for example, in units of control loops.

First, the segment selector 103 selects a range of a segment SG1 shown in FIG. 8 which is a first segment to be optimized. The segment SG1 is a control loop in which the yield of final products of the plant device P0 (in other words, the monitor value of a monitor M1), a monitor value of a monitor M2 that is a variable parameter outside the segment representing an input from another adjacent segment to the segment SG1, and a monitor value of a monitor M3 that is a variable parameter outside the segment representing an output from the segment SG1 to another adjacent segment are controlled by adjusting valve opening of the valves V1 and V2.

The learner 108 changes the valve opening of the valves V1 and V2 that are variable parameters inside the segment and the monitor values of the monitors M2 and M3 that are variable parameters outside the segment such that the monitor value of the monitor M1 measuring the yield of final products is maximized. When the learner 108 completes a search for the parameter values (valve opening) of the variable parameters inside the segment and the parameter values (monitor value) of the variable parameters outside segment for maximizing the monitor value of the monitor M1, the learner 108 stores the parameter values in a storage area (for example, the RAM 12).

Next, the segment selector 103 selects a range of a segment SG2 shown in FIG. 9 which is a next segment to be optimized. In the learning in the segment SG1, the monitors M2 and M3 that are variable parameters outside the segment become fixed parameters outside the segment in learning in the segment SG2. In other words, the learner 108 changes the parameter value (valve opening) of the valve V3 that is a variable parameter inside the segment and the parameter value (monitor value) of the monitor M4 that is a variable parameter outside the segment to be the parameter values (monitor values) of the monitors M2 and M3 searched through the learning in the segment SG1.

The segment SG2 is a control loop in which a parameter value (monitor value) of the monitor M2 that is a fixed parameter outside the segment representing an output from the segment SG2 to the segment SG1, a parameter value (monitor value) of the monitor M3 that is a fixed parameter outside the segment representing an input from the segment SG1 to the segment SG2, and a parameter value (monitor value) of the monitor M4 that is a variable parameter outside the segment representing an input to the segment SG2 from another adjacent segment are controlled by adjusting the parameter value (valve opening) of the valve V3.

When the learner 108 completes a search for the parameter value (valve opening) of the valve V3 that is a variable parameter inside the segment and a parameter value (monitor value) of the monitor M4 that is a variable parameter outside the segment, the learner 108 stores the parameter values in a storage area (for example, the RAM 12).

Next, the segment selector 103 selects a range of a segment SG3 shown in FIG. 10 which is a next segment to be optimized. In the learning in the segment SG2, the monitors M4 that are variable parameters outside the segment becomes a fixed parameter outside the segment in learning in the segment SG3. In other words, the learner 108 changes the parameter values (valve opening) of the valves V4 to V8 that are variable parameters inside the segment and the parameter value (monitor value) of the monitor M5 that is a variable parameter outside the segment to be the parameter value (monitor value) of the monitors M4 searched through the learning in the segment SG2.

The segment SG3 is a control loop in which a parameter value (monitor value) of the monitor M4 that is a fixed parameter outside the segment representing an output from the segment SG3 to the segment SG2 and a parameter value (monitor value) of the monitor M5 that is a variable parameter outside the segment representing an input to the segment SG3 from another adjacent segment are controlled by adjusting the parameter values (valve opening) of the valves V4 to V8.

When the learner 108 completes a search for the parameter value (valve opening) of the valves V4 to V8 that are variable parameters inside the segment and a parameter value (monitor value) of the monitor M5 that is a variable parameter outside the segment, the learner 108 stores the parameter values in a storage area (for example, the RAM 12).

In this way, the segment selector 103, on the basis of the I/O diagram and the segment diagram, selects a control loop generating final products of the plant device P0 as a first segment to be optimized and thereafter, on the basis of the I/O diagram and the segment diagram, sequentially selects a segment (control loop) corresponding to a one-stage upstream process of the selected segment as a segment to be optimized next. In this way, the learner 108, on the basis of the I/O diagram and the segment diagram, in a plurality of segments configuring the plant device P0, can sequentially execute learning for acquiring optimal values of parameters representing the operation state for each segment sequentially from a segment that is the most downstream process to a segment of a further upstream side in the plant device P0.

When the optimization for all the segments of the plant device P0 using the learner 108 is completed, the whole optimizer 110 executes learning for acquiring the whole optimal values of the parameters representing the operation state for the whole plant device P0 as a target using the parameter values stored in a storage area (for example, the RAM 12) in the process described above as initial values.

[Calculation of Relationship Probability Between Parameters]

Figure 11:
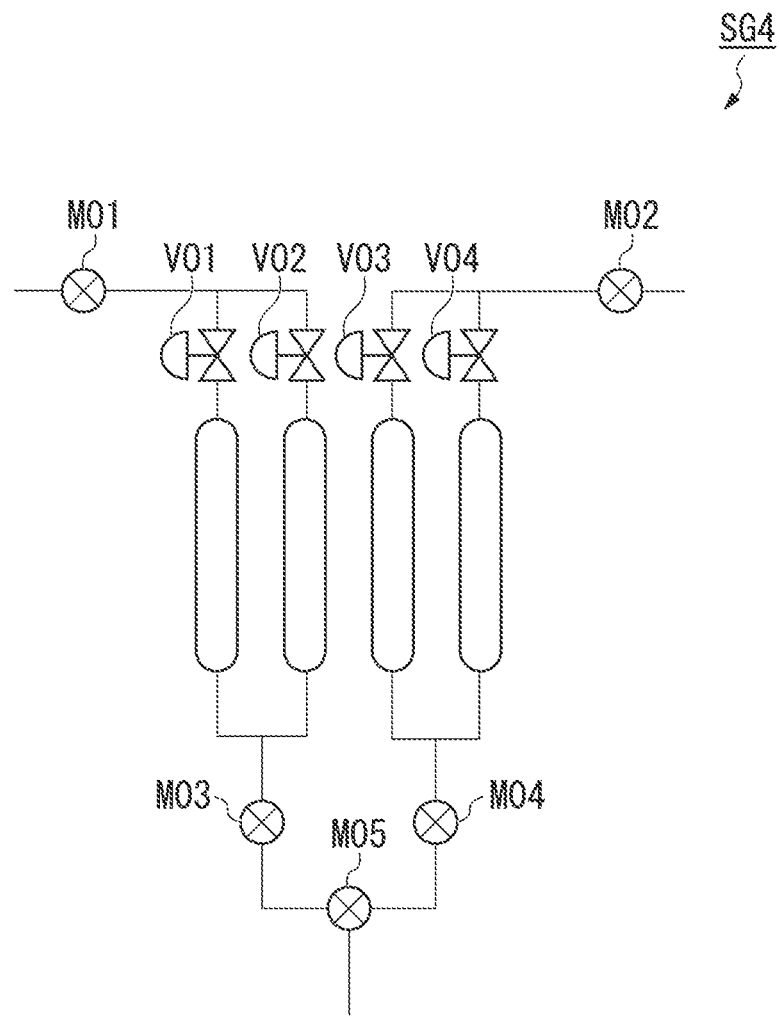
FIG. 11 is a diagram showing one example of a segment of a plant device controlled by the plant control supporting apparatus 1 according to the first embodiment of the present invention.
Figure 12:
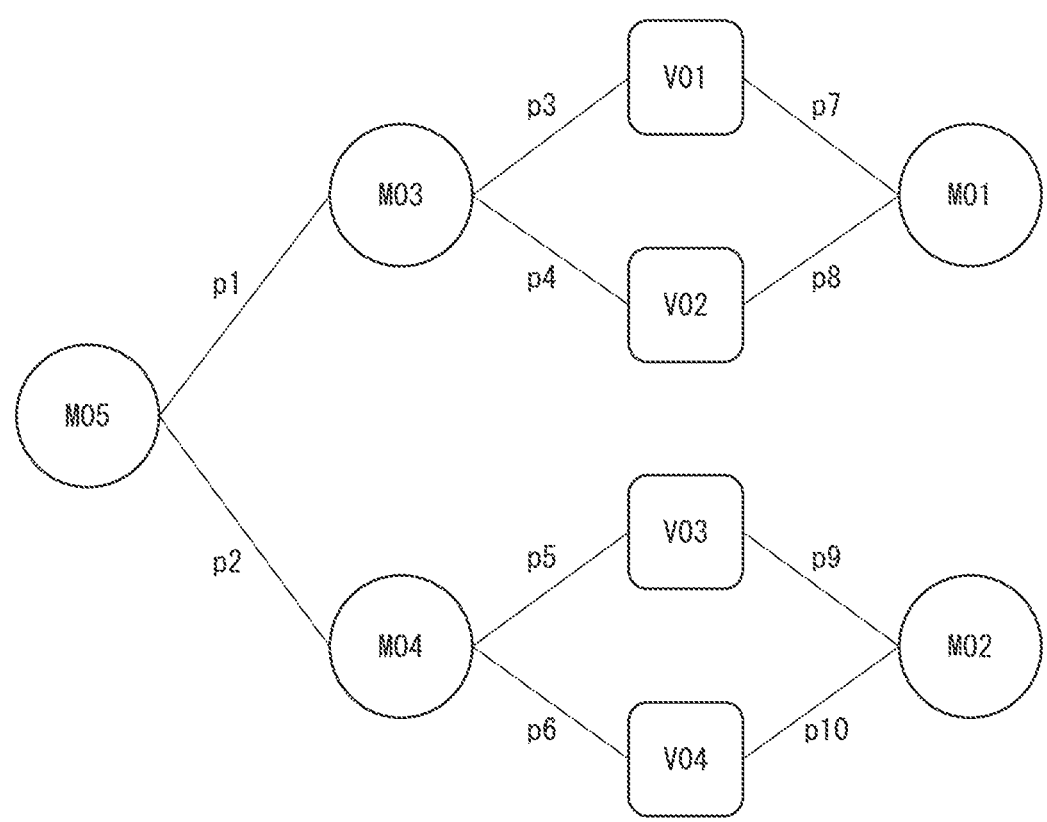
FIG. 12 is a diagram showing one example of a segment of a plant device controlled by the plant control supporting apparatus 1 according to the first embodiment of the present invention.

Next, calculation of a relationship probability between parameters will be described with reference to drawings. FIGS. 11 and 12 are diagrams showing one example of a segment of a plant device controlled by the plant control supporting apparatus 1 according to the first embodiment of the present invention.

As shown in FIG. 11, a segment SG4 includes monitors M01 to M05 and valves V01 to V04.

Generally, in a case in which learning for acquiring optimal values of parameters representing the operation state is performed for the segment as shown in FIG. 11, a process of searching for optimal values is performed while changing all the parameter values (valve opening) of the valves V01 to V04 that are variable parameters. However, as described above, as the number of variable parameters is increased, the number of combinations of parameter values to be taken becomes very large, and accordingly, there are cases in which a long time is required for the learning to converge, the learning does not converge, the learning easily converges to be a local optimum, and the like.

Generally, in the case of a plant, for example, as shown in FIG. 10, a segment diagram representing segments in a drawing is present in advance, and accordingly, from the segment diagram, whether a parameter value of a certain variable parameter has an influence (or easily has an influence) on a parameter value of a certain monitor parameter can be estimated.

For example, on the basis of the segment diagram shown in FIG. 11, for example, in a case in which the monitor value of the monitor M04 is desired to be changed, only the valve opening of the valves V03 and V04 may be changed, and it can be predicted that the valve opening of the valves V01 and V02 has no influence (or a little influence) on the monitor value of the monitor M04 by a user (a system manager, an operator, or the like).

The parameter refiner 107 can logically generate a relationship model representing the relationship between parameters as shown in FIG. 12 from the segment diagram shown in FIG. 11.

Each model of the relationship model shown in FIG. 12 corresponds to a field device shown in FIG. 11. In other words, for example, a node "M01" corresponds to the monitor M01, and a node "V01" corresponds to the valve V01. P1 to p10 attached to solid lines joining the nodes represent relationship probabilities between parameters (in other words, monitor values or valve opening) corresponding the nodes.

The parameter refiner 107 outputs the relationship model to the learner 108. The learner 108 performs learning using artificial intelligence by using the relationship model to learn whether there is a high possibility that a monitor value of a monitor greatly changes in a case in which the valve opening of a certain valve is changed and the like, and calculates a relationship probability (Bayes probability) of the parameter.

For example, as shown in FIG. 12, the degree of influence of the monitor value of the monitor M01 on the monitor value of the monitor M05 can be calculated using $P0501=(P7*P3+P8*P4)*P1$. For example, the degree of influence of the monitor value of the monitor M03 on the monitor value of the monitor M05 can be calculated using $P0503=P1$. Accordingly, since it is known that $P0501 \leq P0503$, it can be recognized that there is a high probability of changing the monitor M05 by changing the monitor M03 rather than by changing the monitor M01. Although all the initial values of P1 to P10 are "1," the initial values are changed to actual values in the stage of performing learning.

In this way, the plant control supporting apparatus 1 according to the present embodiment can take in information relating to effectiveness (high probability) of a change in the parameter value of a certain variable parameter for causing a necessary change in a parameter value of the monitor parameter from the segment diagram. Accordingly, the plant control supporting apparatus 1 can cause learning for acquiring optimal values of parameters representing the operation state to converge in a shorter time or to converge without being a local optimum.

As described above, the plant control supporting apparatus 1 according to the present embodiment executes learning with information that is, generally, necessarily present at the time of designing a plant being automatically or semi-automatically set as input data (parameters) of learning using artificial intelligence. The necessarily-present information described here, as described above, is the I/O diagram, the segment diagram, the alarm setting definition data, and the parameter provisional initial value data, and the like.

Accordingly, the plant control supporting apparatus 1 according to the present embodiment can be applied to plants of various types of industry regardless of whether the plant is a plant that has been installed or a newly-installed plant and regardless of the field of the plant.

In addition, as described above, the plant control supporting apparatus 1 according to the present embodiment segments the plant device on the basis of the segment diagram or the I/O diagram and executes learning for acquiring optimal values of parameters representing the operation state for each segment. The plant control supporting apparatus 1 may decrease the number of parameters that are targets for learning on the basis of the configuration information of the field device inside the plant represented by the segment diagram or use information representing the effectiveness or relevance of parameters using probabilities for learning.

Accordingly, the plant control supporting apparatus 1 according to the present embodiment can cause learning to easily converge in a shorter time.

Generally, in a case in which a plant is controlled using artificial intelligence, although it is frequently difficult to control the whole plant once, according to the plant control supporting apparatus 1 of the present embodiment, the whole plant can be controlled by performing control for each segment.

Second Embodiment

According to the first embodiment, the plant control supporting apparatus having the function of a DCS has a function of executing learning using artificial intelligence, and the plant control supporting apparatus executes learning for acquiring optimal values of the parameters representing the operation state of the field device. Accordingly, by adjusting the parameters of the field device on the basis of a result of convergence of the learning, the plant control supporting apparatus enables automatic control of the plant.

On the other hand, in a second embodiment, a plant simulator has a function of executing learning using artificial intelligence. Accordingly, the plant simulator, for example, sets a state of a time when a trouble occurs in a plant as a parameter provisional initial value and can simulate the motion of the actual plant device.

Accordingly, the plant simulator can discover an optimal recovery sequence (for example, in a shortest time) for the occurrence of a trouble.

In this way, the plant simulator according to the present embodiment can safely perform a simulation in advance in the plant simulator before applying the parameter values of the parameters set in the process of learning to an actual plant. According to the present embodiment, a structure in which parameter values of the parameters, which are a result of learning, are applied to an actual plant can be provided after a stable operation of the plant device is checked in the plant simulator.

In the plant simulator, a time scale can be freely set (for example, double speed, 10× speed, or the like). Generally, in a case in which parameter values are optimized through reinforcement learning using artificial intelligence, it is necessary to consider a time lag until the system reacts to changes in the parameter values. However, according to the present embodiment, the time scale can be freely changed while the stability of the system is checked, and accordingly, even control of a plant having a long time lag can be simulated in a shorter time.

A part or the whole of the plant 100 or the plant control supporting apparatus 1 according to the embodiments described above may be realized using a computer. In such a case, a part or the whole thereof may be realized by recording a program for realizing the control function on a computer-readable recording medium and causing the computer system to read and execute the program recorded on the recording medium.

The "computer system" described here is a computer system built in the plant 100 or the plant control supporting apparatus 1 and includes an OS and hardware such as peripherals. The "computer-readable recording medium" represents a portable medium such as a flexible disc, a magneto-optical disk, a ROM, or a CD-ROM or a storage device such as a hard disk built in the computer system.

The "computer-readable recording medium" includes a medium dynamically storing the program for a short time such as a communication line of a case in which the program is transmitted through a network such as the Internet or a communication line such as a telephone circuit and a medium storing the program for a predetermined time such as a volatile memory inside the computer system serving as a server or a client in such a case. The program described above may be a program used for realizing a part of the function described above and, furthermore, may be a program to be combined with a program that has already been recorded in the computer system for realizing the function described above.

A part or the whole of the plant 100 or the plant control supporting apparatus 1 according to the embodiment described above may be realized as an integrated circuit of a large scale integration (LSI) or the like. Each functional block of the plant 100 or the plant control supporting apparatus 1 may be individually configured as a processor, or a part or the whole of the functional block may be integrated and configured as a processor. A technique used for configuring the integrated circuit is not limited to the LSI, and each function may be realized by a dedicated circuit or a general-purpose processor. In a case in which a technology of configuring an integrated circuit replacing the LSI emerges in accordance with the progress of semiconductor technologies, an integrated circuit using such a technology may be used.

What is claimed is:

1. A plant control supporting apparatus comprising a processor configured to at least:
    select, from among a plurality of segments defined in units of control loops in a plant, a segment for which first learning for acquiring an optimal value of at least one parameter representing an operation state is executed;
    define a reward function used for the first learning;
    extract at least one parameter that is a target for the first learning in the selected segment based on input and output information of a device used in the plant and segment information representing a configuration of a device included in the selected segment;
    perform the first learning for acquiring the optimal value of the at least one parameter for each segment based on the reward function and the extracted at least one parameter;
    perform second learning for acquiring a whole optimization value of the at least one parameter for a whole of the plurality of segments on the basis of the optimal value of the at least one parameter acquired in the first learning performed for each segment; and
    output an operation instruction used for giving an instruction for operating the plurality of segments on the basis of the whole optimization value acquired in the second learning,
    wherein
        the selecting of the segment comprises sequentially selecting the plurality of segments defined in the plant from a segment in a further downstream process to a segment in a further upstream process in accordance with a flow of a series of processes in the plant, or from a segment in a further upstream process to a segment in a further downstream process in accordance with the flow of the series of processes in the plant.

2. The plant control supporting apparatus according to claim 1, wherein the processor is configured to:
    classify the extracted at least one parameter into variable parameters inside the selected segment, monitor parameters inside the selected segment, variable parameters outside the selected segment, or fixed parameters outside the selected segment on the basis of the segment information and the input and output information; and
perform the first learning on the basis of the classified parameters.

3. The plant control supporting apparatus according to claim 2, wherein the processor is configured to perform the first learning using a relationship model, which represents the relationship between parameters, on the basis of the segment information.

4. The plant control supporting apparatus according to claim 1,
wherein the processor is configured to:
define a penalty function for decreasing a value of the reward function in accordance with a value on the basis of an alarm generated in the plant; and
perform the first learning for each segment on the basis of the penalty function.

5. The plant control supporting apparatus according to claim 1, wherein the processor is configured to
refine the extracted at least one parameter by specifying at least one parameter not contributing to a purpose of maximizing the reward function on the basis of the segment information and excluding the specified at least one parameter from the extracted at least one parameter.

6. The plant control supporting apparatus according to claim 1,
wherein the plurality of segments comprise a first segment and a second segment in a upstream of the first segment in a flow of processes in the plant, and
wherein the processor is configured to select the first segment, and then select the second segment.

7. The plant control supporting apparatus according to claim 2,
wherein the plurality of segments comprise a first segment and a second segment in a upstream of the first segment in a flow of processes in the plant,
wherein the processor is configured to select the first segment, and then select the second segment, and
wherein the variable parameter outside the segment classified when selecting the first segment corresponds to the fixed parameter outside the segment classified when selecting the second segment.

8. A plant control supporting method using a computer, the plant control supporting method comprising:
selecting, by the computer from among a plurality of segments defined in units of control loops in a plant, a segment for which first learning for acquiring an optimal value of at least one parameter representing an operation state is executed;
defining, by the computer, a reward function used for the first learning;
extracting, by the computer, at least one parameter that is a target for the first learning in the selected segment based on input and output information of a device used in the plant and based on segment information representing a configuration of a device included in the selected segment;
performing, by the computer, the first learning for acquiring the optimal value of the at least one parameter for each segment based on the reward function and the extracted at least one parameter;
performing second learning for acquiring a whole optimization value of the at least one parameter for a whole of the plurality of segments on the basis of the optimal value of the at least one parameter acquired in the first learning performed for each segment; and
outputting an operation instruction used for giving an instruction for operating the plurality of segments on the basis of the whole optimization value acquired in the second learning,
wherein
the selecting of the segment comprises sequentially selecting the plurality of segments defined in the plant from a segment in a further downstream process to a segment in a further upstream process in accordance with a flow of a series of processes in the plant, or from a segment in a further upstream process to a segment in a further downstream process in accordance with the flow of the series of processes in the plant.

9. The plant control supporting method according to claim 8, further comprising:
classifying the at least one parameter extracted into variable parameters inside the selected segment, monitor parameters inside the selected segment, variable parameters outside the selected segment, or fixed parameters outside the selected segment on the basis of the segment information and the input and output information,
wherein the first learning comprises learning on the basis of the parameters classified.

10. The plant control supporting method according to claim 9, wherein the first learning comprises learning using a relationship model, which represents the relationship between parameters, on the basis of the segment information.

11. The plant control supporting method according to claim 8,
wherein defining the reward function comprises defining a penalty function for decreasing a value of the reward function in accordance with a value on the basis of an alarm generated in the plant, and
wherein the first learning comprises learning for each segment on the basis of the penalty function.

12. The plant control supporting method according to claim 8, further comprising:
refining the at least one parameter extracted by specifying at least one parameter not contributing to a purpose of maximizing the reward function on the basis of the segment information and excluding the specified at least one parameter from the at least one parameter extracted.

13. The plant control supporting method according to claim 8,
wherein the plurality of segments comprise a first segment and a second segment in a upstream of the first segment in a flow of processes in the plant, and
wherein selecting the segment comprises selecting the first segment, and then selecting the second segment.

14. The plant control supporting method according to claim 9,
wherein the plurality of segments comprise a first segment and a second segment in a upstream of the first segment in a flow of processes in the plant,
wherein selecting the segment comprises selecting the first segment, and then selecting the second segment, and
wherein the variable parameter outside the segment classified when selecting the first segment corresponds to the fixed parameter outside the segment classified when selecting the second segment.

15. A non-transitory computer-readable storage medium storing a plant control supporting program, which when executed by a computer, causes the computer to:
- select, from among a plurality of segments defined in units of control loops in a plant, a segment for which first learning for acquiring an optimal value of at least one parameter representing an operation state is executed;
- define a reward function used for the first learning;
- extract at least one parameter that is a target for the first learning in the selected segment based on input and output information of a device used in the plant and based on segment information representing a configuration of a device included in the selected segment; and
- perform the first learning for acquiring the optimal value of the at least one parameter for each segment based on the reward function and the extracted at least one parameter;
- perform second learning for acquiring a whole optimization value of the at least one parameter for a whole of the plurality of segments on the basis of the optimal value of the at least one parameter acquired in the first learning performed for each segment and
- output an operation instruction used for giving an instruction for operating the plurality of segments on the basis of the whole optimization value acquired in the second learning, wherein
- the selecting of the segment comprises sequentially selecting the plurality of segments defined in the plant from a segment in a further downstream process to a segment in a further upstream process in accordance with a flow of a series of processes in the plant, or from a segment in a further upstream process to a segment in a further downstream process in accordance with the flow of the series of processes in the plant.

16. The non-transitory computer-readable storage medium according to claim 15, wherein the plant control supporting program, which when executed by the computer, further causes the computer to:
- classify the at least one parameter extracted into variable parameters inside the selected segment, monitor parameters inside the selected segment, variable parameters outside the selected segment, or fixed parameters outside the selected segment on the basis of the segment information and the input and output information, and
- wherein the first learning comprises learning on the basis of the parameters classified.

\* \* \* \* \*